US012342386B2

(12) United States Patent
Lei et al.

(10) Patent No.: US 12,342,386 B2
(45) Date of Patent: Jun. 24, 2025

(54) METHOD FOR PROVIDING CHANNEL STATE INFORMATION IN RANDOM-ACCESS MESSAGES

(71) Applicant: QUALCOMM Incorporated, San Diego, CA (US)

(72) Inventors: Jing Lei, San Diego, CA (US); Qiaoyu Li, Beijing (CN); Chao Wei, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 463 days.

(21) Appl. No.: 17/923,074

(22) PCT Filed: May 4, 2020

(86) PCT No.: PCT/CN2020/088572
§ 371 (c)(1),
(2) Date: Nov. 3, 2022

(87) PCT Pub. No.: WO2021/223052
PCT Pub. Date: Nov. 11, 2021

(65) Prior Publication Data
US 2023/0156807 A1    May 18, 2023

(51) Int. Cl.
*H04W 74/0833* (2024.01)
*H04L 5/00* (2006.01)
(Continued)

(52) U.S. Cl.
CPC ....... *H04W 74/0833* (2013.01); *H04L 5/0048* (2013.01); *H04W 72/12* (2013.01);
(Continued)

(58) Field of Classification Search
CPC . H04W 74/0833; H04W 72/12; H04W 72/21; H04W 72/231; H04W 72/232;
(Continued)

(56) References Cited

U.S. PATENT DOCUMENTS 10,681,652 B2 * 6/2020 Gaal .................... H04W 52/365
10,687,322 B2 * 6/2020 Seo ........................ H04W 72/23
(Continued)

FOREIGN PATENT DOCUMENTS

CN    102684850 A    9/2012
CN    104780559 A    7/2015
(Continued)

OTHER PUBLICATIONS

ERICSSON: "Early CSI Reporting in HO", Tdoc R1-1907472, 3GPP TSG-RAN WG1 Meeting #97, Reno, USA, May 13-17, 2019, May 3, 2019, pp. 1-3, section 2.
(Continued)

*Primary Examiner* — Mounir Moutaouakil
(74) *Attorney, Agent, or Firm* — Loza & Loza, LLP

(57) ABSTRACT

Technologies and techniques for wireless communication between a scheduled entity and a scheduling entity in a wireless communication network. A scheduled entity receives a downlink (DL) reference signal (RS) from the scheduling entity on a channel between the scheduling entity and the scheduled entity. The scheduled entity obtains channel state information (CSI) for the channel between the scheduling entity and the scheduled entity using the received DL RS, selects an uplink resource associated with a random-access procedure, and multiplexes a CSI report including the CSI with a random-access message related to the random-access procedure to produce multiplexed information.

23 Claims, 24 Drawing Sheets

(51) Int. Cl.
  *H04W 72/12*     (2023.01)
  *H04W 72/21*     (2023.01)
  *H04W 72/231*    (2023.01)
  *H04W 72/232*    (2023.01)

(52) U.S. Cl.
  CPC ......... *H04W 72/21* (2023.01); *H04W 72/231* (2023.01); *H04W 72/232* (2023.01)

(58) Field of Classification Search
  CPC . H04W 74/0836; H04W 24/08; H04W 24/10; H04W 72/1268; H04L 5/0048; H04L 5/0044; H04L 5/005; H04L 5/0057; H04B 7/0626
  See application file for complete search history.

(56) References Cited

U.S. PATENT DOCUMENTS

| | | | |
|---|---|---|---|
| 10,820,355 B2 * | 10/2020 | Hui | H04W 74/085 |
| 11,751,184 B2 * | 9/2023 | Venugopal | H04B 17/345 370/252 |
| 11,870,720 B2 * | 1/2024 | Sun | H04L 5/0094 |
| 12,075,384 B2 * | 8/2024 | Ma | H04W 72/23 |
| 12,255,848 B2 * | 3/2025 | Yang | H04L 1/0003 |
| 2017/0353976 A1 | 12/2017 | Yerramalli et al. | |
| 2019/0215119 A1 | 7/2019 | Kim et al. | |
| 2020/0383119 A1 | 12/2020 | Sun et al. | |

FOREIGN PATENT DOCUMENTS

| | | | | |
|---|---|---|---|---|
| CN | 106170942 A | | 11/2016 | |
| CN | 106788646 A | | 5/2017 | |
| CN | 108476049 A | | 8/2018 | |
| CN | 110113818 A | | 8/2019 | |
| CN | 110249549 A | | 9/2019 | |
| CN | 111953460 A | * | 11/2020 | ........... H04L 5/0005 |
| CN | 106455091 B | * | 10/2021 | ........ H04W 72/1226 |
| WO | 2012124552 A1 | | 9/2012 | |
| WO | 2017089898 A1 | | 6/2017 | |
| WO | 2018061088 A1 | | 4/2018 | |
| WO | 2018143697 A1 | | 8/2018 | |

OTHER PUBLICATIONS

International Search Report and Written Opinion—PCT/CN2020/088572—ISA/EPO—Feb. 10, 2021.

LG Electronics: "Downlink Channel Quality Report During Random Access Procedure", R1-1812531, 3GPP TSG RAN WG1 Meeting #95, Spokane, USA, Nov. 12-16, 2018, Nov. 16, 2018, 8 Pages, section 2.

LG Electronics: "Downlink Channel Quality Report During Random Access Procedure", R1-1904609, 3GPP TSG RAN WG1 Meeting #96bis, Xi'an, China, Apr. 8-12, 2019, Apr. 12, 2019, 5 Pages, section 2.

ERICSSON: "Procedure for Two-Step RACH", 3GPP TSG-RAN WG1 Meeting #98, R1-1910907, Chongqing, China, Oct. 14-18, 2019, Oct. 18, 2019 (Oct. 18, 2019) The Whole Document, pp. 1-18, XP051808739, Retrieved from the Internet: URL: https://ftp.3gpp.org/tsg_ran/WG1_RL1/TSGR1_98b/Docs/R1-1910907.zip. R1-1910907 Procedurefor Two-step RACH.docx [retrieved on Oct. 5, 2019].

Motorola Mobility., et al., "2-step RACH Procedure", 3GPP TSG RAN WG1 #98bis, R1-1911035, 3rd Generation Partnership Project (3GPP), Mobile Competence Centre, 650, Route Des Lucioles, F-06921, Sophia-Antipolis Cedex, France, vol. RAN WG1, No. Chongqing, China, Oct. 14, 2019-Oct. 20, 2019, Oct. 5, 2019, pp. 1-6, XP051808801, The Whole Document.

Supplementary European Search Report—EP20934814—Search Authority—The Hague—Nov. 20, 2023.

* cited by examiner

METHOD FOR PROVIDING CHANNEL STATE INFORMATION IN RANDOM-ACCESS MESSAGES

CROSS-REFERENCE TO RELATED APPLICATION(S)

This application is the U.S. national stage of PCT patent application number PCT/CN2020/088572 filed on May 4, 2020.

TECHNICAL FIELD

The technology discussed below relates generally to wireless communication networks, and more particularly, to techniques for providing channel state information in random-access messages.

INTRODUCTION

In wireless communication systems, such as those specified under standards for 5G New Radio (NR), an access point (e.g., a base station) may communicate with a user equipment (UE) (e.g., a smartphone). The communication can utilize a modulation and coding scheme (MCS), rank, and precoding matrix selected based on an estimate of the channel between the base station and the UE. To assist the UE in estimating the channel, the base station may transmit one or more reference signals, such as channel state information—reference signals (CSI-RS), to the UE. After channel estimation, the UE may return a channel state information (CSI) report indicating the quality of the channel to the base station. The CSI may include, for example, a channel quality indicator (CQI) that indicates to the base station and MCS to use for downlink transmissions to the UE, a rank indicator (RI) that indicates to the base station the rank to use for transmissions to the UE, a precoding matrix indicator (PMI) that indicates to the base station the precoding matrix to use for transmissions to the UE, and other suitable parameters.

As the demand for mobile broadband access and communications continues to increase, research and development continue to advance wireless communication technologies not only to meet the growing demand for mobile broadband access, but to advance and enhance mobile communications. Accordingly, the present disclosure addresses technologies and techniques to improve device and network efficiencies for applications, such as link adaptation, that rely on CSI/CQI reporting.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication between a scheduled entity and a scheduling entity in a wireless communication network is disclosed, the method comprising, at the scheduled entity: receiving a downlink (DL) reference signal (RS) from the scheduling entity on a channel between the scheduling entity and the scheduled entity; obtaining channel state information (CSI) for the channel between the scheduling entity and the scheduled entity using the received DL RS; selecting an uplink resource associated with a random-access procedure; multiplexing a CSI report comprising the CSI with a random-access message related to the random-access procedure to produce multiplexed information; and transmitting the multiplexed information in the random-access message to the scheduling entity on the selected uplink resource.

In another example, a scheduled entity is disclosed within a wireless communication network, comprising a transceiver, a memory, and a processor communicatively coupled to the transceiver and the memory, wherein the processor and the memory are configured to receive a downlink (DL) reference signal (RS) from the scheduling entity on a channel between the scheduling entity and the scheduled entity, and obtain channel state information (CSI) for the channel between the scheduling entity and the scheduled entity using the received DL RS. The processor and the memory are further configured to select an uplink resource associated with a random-access procedure, multiplex a CSI report comprising the CSI with a random-access message related to the random-access procedure to produce multiplexed information, and transmit the multiplexed information in the random-access message to the scheduling entity on the selected uplink resource.

In another example, a scheduled entity is disclosed in a wireless communication network, comprising means for receiving a downlink (DL) reference signal (RS) from the scheduling entity on a channel between the scheduling entity and the scheduled entity, and means for obtaining channel state information (CSI) for the channel between the scheduling entity and the scheduled entity using the received DL RS. The scheduled entity may further include means for selecting an uplink resource associated with a random-access procedure, means for multiplexing a CSI report comprising the CSI with a random-access message related to the random-access procedure to produce multiplexed information, and means for transmitting the multiplexed information in the random-access message to the scheduling entity on the selected uplink resource.

In another example, a computer-readable medium is disclosed, having stored therein instructions executable by one or more processors of a scheduled entity to receive a downlink (DL) reference signal (RS) from the scheduling entity on a channel between the scheduling entity and the scheduled entity, obtain channel state information (CSI) for the channel between the scheduling entity and the scheduled entity using the received DL RS, select an uplink resource associated with a random-access procedure, multiplex a CSI report comprising the CSI with a random-access message related to the random-access procedure to produce multiplexed information, and transmit the multiplexed information in the random-access message to the scheduling entity on the selected uplink resource.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
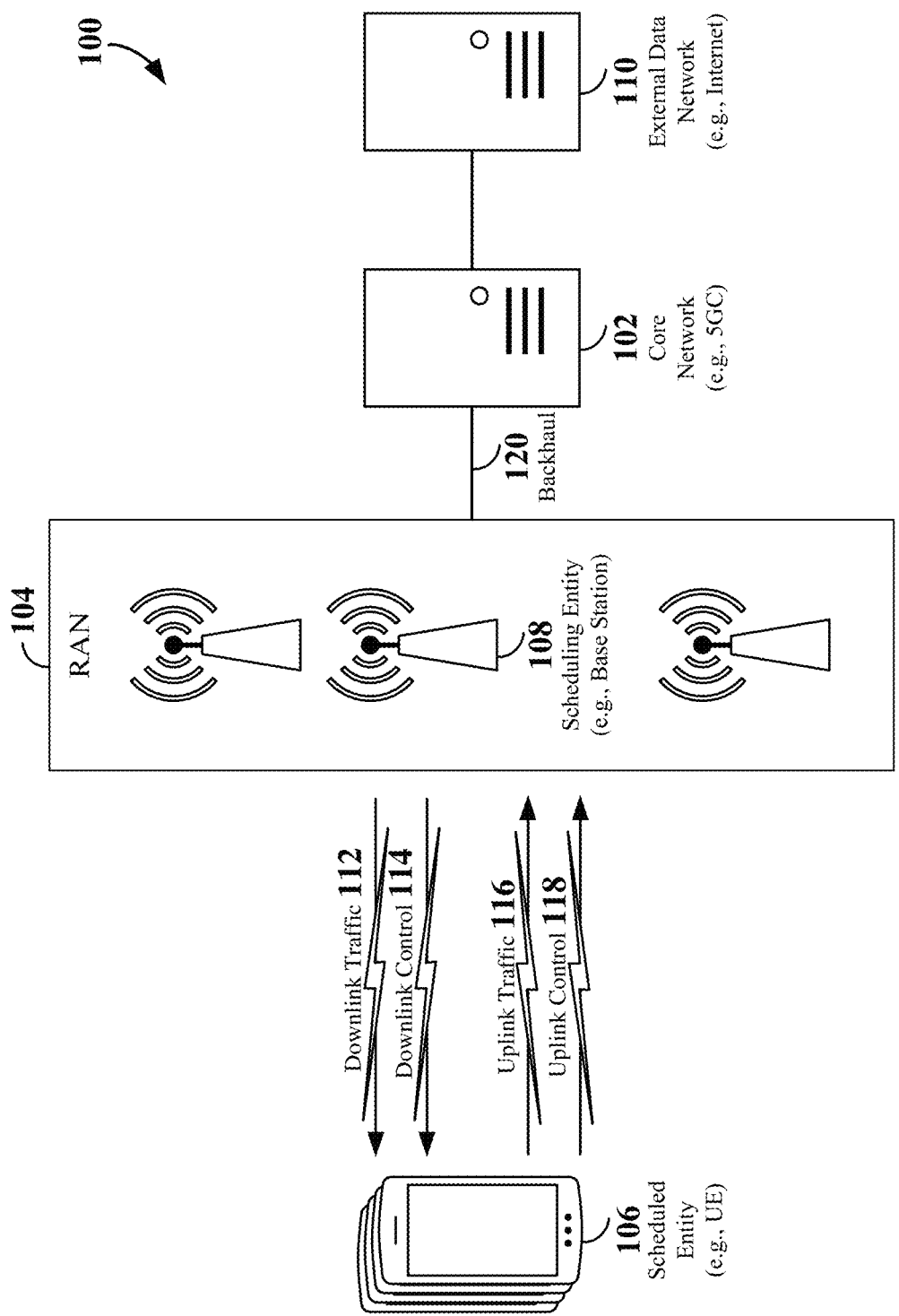
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Various aspects of the disclosure relate to CSI measurement reporting from a UE to a base station. In NR light (New Radio-light) for a lower-cost wireless link, link adaptation of the Physical Downlink Control Channel (PDCCH) and Physical Downlink Shared Channel (PDSCH) is useful for enhancing the coverage and spectral efficiency of the wireless link. An aperiodic and compressed Channel Quality Indicator/Channel State Information (CQI/CSI) report can be transmitted in a Physical Uplink Shared Channel (PUSCH), Physical Uplink Control Channel (PUCCH), or Uplink Control Information (UCI) piggybacked on a PUSCH. This early reporting enhances the wireless link sooner and with less overhead.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable radio access technology (RAT) or RATs to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network—New Radio dual connectivity (EN-DC) UE that is capable of simultaneously connecting to an LTE base station and a NR base station to receive data packets from both the LTE base station and the NR base station.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things". A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
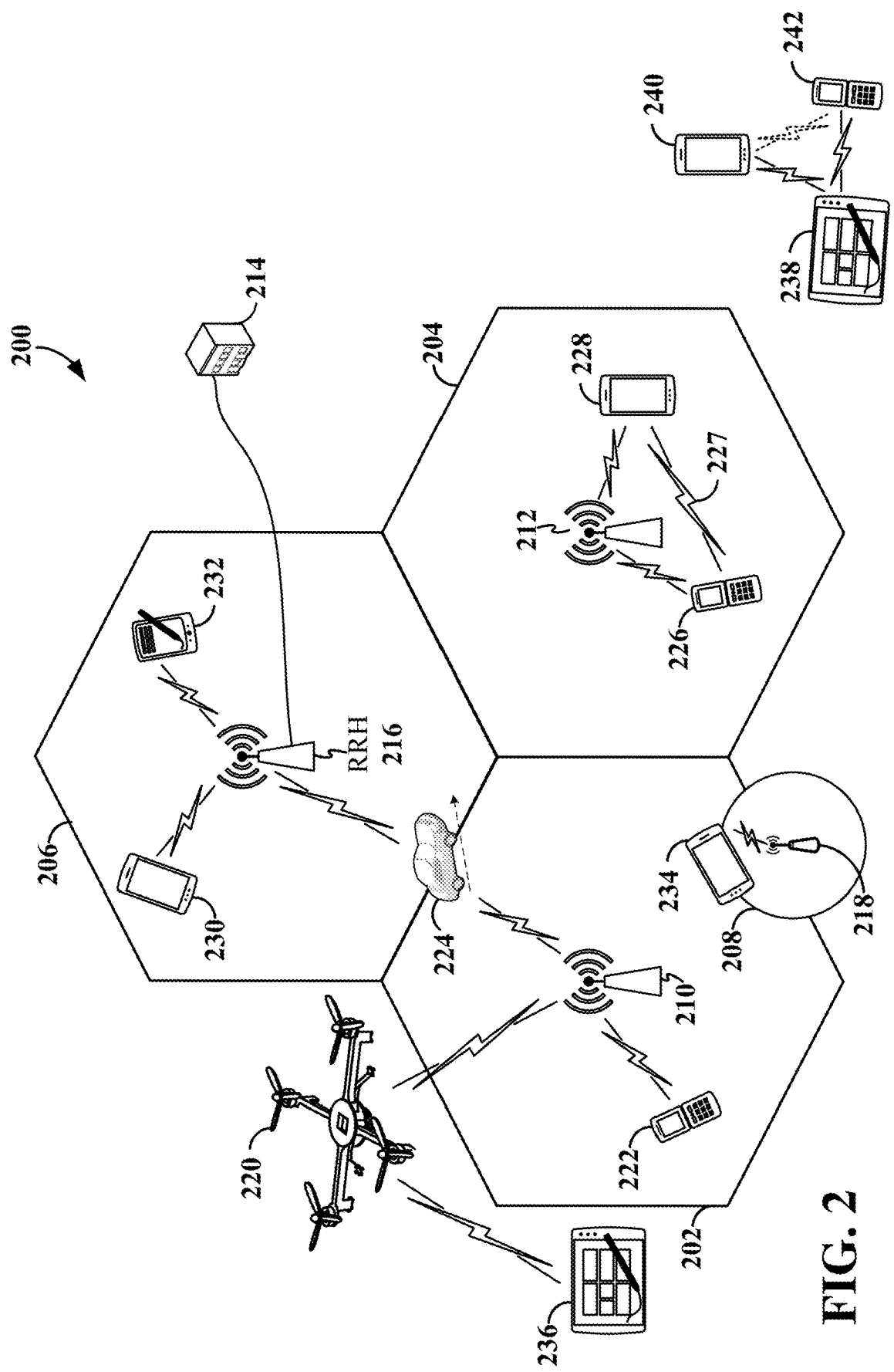
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, where a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In this example, sidelink or other type of direct link signals may be communicated directly between UEs without necessarily relying on scheduling or control information from another entity. For example, UE 238 is illustrated communicating with UEs 240 and 242. In some examples, the UE 238 is functioning as a scheduling entity, while the UEs 240 and 242 may function as scheduled entities.

UEs 238, 240, and 242 may communicate over a direct link in a device-to-device (D2D), peer-to-peer (P2P), vehicle-to-everything (V2X), and/or in a mesh network. In a mesh network example, UEs 240 and 242 may optionally communicate directly with one another in addition to communicating with a scheduling entity (e.g., UE 238). In some examples, UE 238 may be a transmitting sidelink device that reserves resources on a sidelink carrier for the transmission of sidelink signals to UEs 240 and 242 in a D2D or V2X network. Here, UEs 240 and 242 are each receiving sidelink devices. UEs 240 and 242 may, in turn, reserve additional resources on the sidelink carrier for subsequent sidelink transmissions.

In some examples, two or more UEs (e.g., UEs 226 and 228) within the coverage area of a serving base station 212 may communicate with both the base station 212 using cellular signals and with each other using sidelink signals 227 without relaying that communication through the base station. In this example, the base station 212 or one or both of the UEs 226 and 228 may function as scheduling entities to schedule sidelink communication between UEs 226 and 228. For example, UEs 226 and 228 may communicate sidelink signals 227 within a vehicle-to-everything (V2X) network.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of base stations (e.g., scheduling entities) 108 and UEs (e.g., scheduled entities) 106 may include suitable hardware and capabilities (e.g., an encoder, a decoder, and/or a CODEC) to utilize one or more of these channel codes for wireless communication.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may further utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
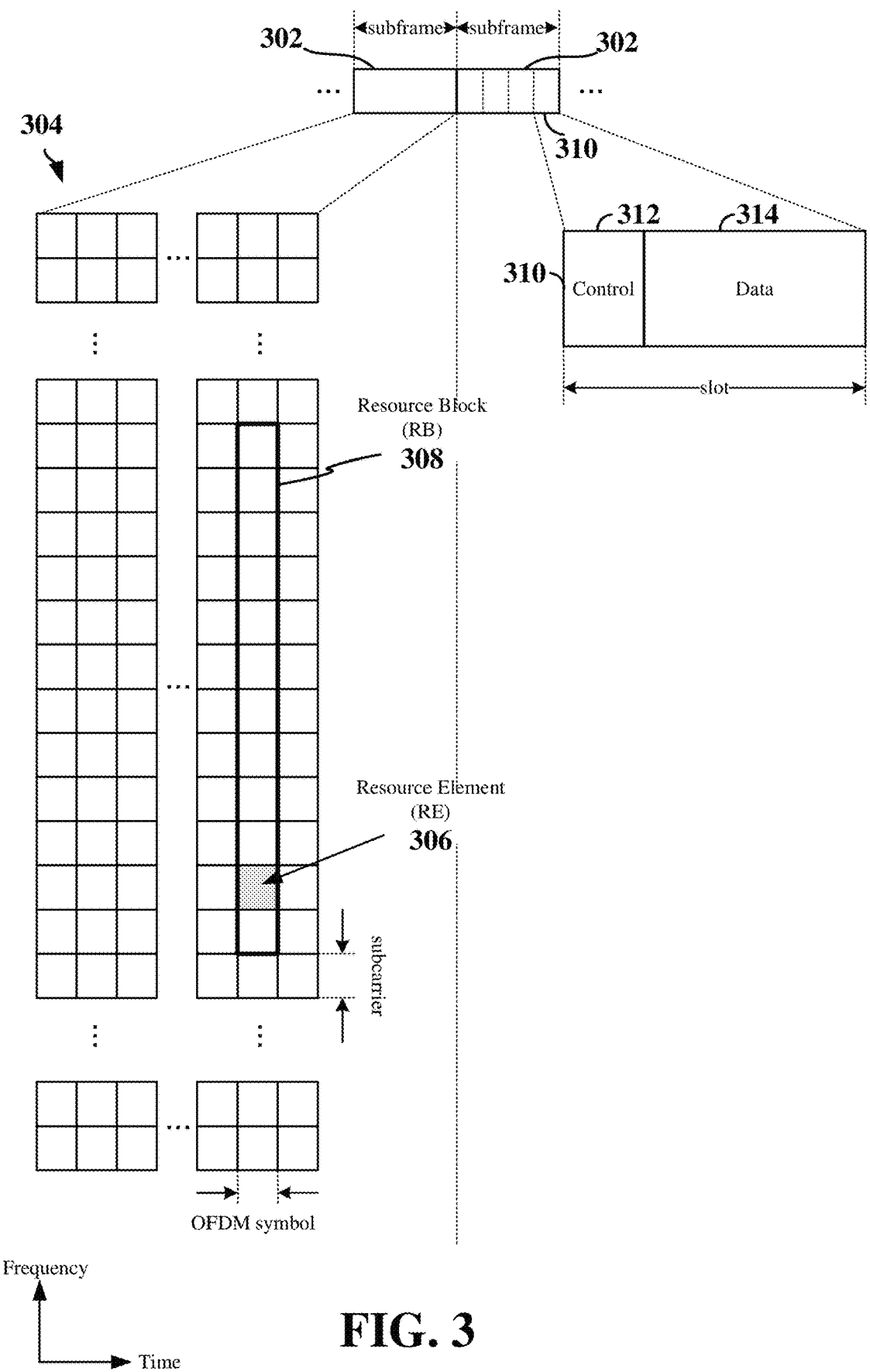
FIG. 3 is a schematic diagram illustrating organization of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time—frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time—frequency grid, and contains a single complex quantity representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 4, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS), a control reference signal (CRS), CSI-RS, or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity) may allocate one or more REs 306 (e.g., within a control region 312) to carry DL control information including one or more DL control channels, such as a PBCH; a physical control format indicator channel (PCFICH); a physical hybrid automatic repeat request (HARQ) indicator channel (PHICH); and/or a physical downlink control channel (PDCCH), etc., to one or more scheduled entities. The transmitting device may further allocate one or more REs 306 to carry other DL signals, such as a DMRS; a phase-tracking reference signal (PT-RS); a channel state information—reference signal (CSI-RS); a primary synchronization signal (PSS); and a secondary synchronization signal (SSS).

The synchronization signals PSS and SSS, and in some examples, the PBCH and a PBCH DMRS, may be transmitted in a synchronization signal block (SSB) that includes 4 consecutive OFDM symbols, numbered via a time index in increasing order from 0 to 3. In the frequency domain, the SSB may extend over 240 contiguous subcarriers, with the subcarriers being numbered via a frequency index in increasing order from 0 to 239. Of course, the present disclosure is not limited to this specific SSB configuration. Other nonlimiting examples may utilize greater or fewer than two synchronization signals; may include one or more supplemental channels in addition to the PBCH; may omit a PBCH; and/or may utilize a different number of symbols and/or nonconsecutive symbols for an SSB, within the scope of the present disclosure.

The PBCH may further include a master information block (MIB) that includes various system information, along with parameters for decoding a system information block (SIB). The SIB may be, for example, a SystemInformation-Type1 (SIB1) that may include various additional system information. Examples of system information may include, but are not limited to, subcarrier spacing, system frame number, cell bar indication, a list of common control resource sets (CoreSets) (e.g., PDCCH CoreSet0 or CoreSet1), a list of common search spaces, a search space for SIB1, a paging search space, a random-access search space, and uplink configuration information.

The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity) may utilize one or more REs 306 to carry UL control information including one or more UL control channels, such as a physical uplink control channel (PUCCH) and/or a Random Access Channel (RACH). The RACH may be used, for example, in a random-access procedure during initial access of the uplink UL control information may include a variety of packet types and categories, including pilots, reference signals, and information configured to enable or assist in decoding uplink data transmissions. For example, the UL control information may include a DMRS or SRS. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information. UL Transmission can be grant-based (i.e. grant delivered using DCI), or grant-free, including type-1 (e.g., only based on RRC configuration without any L1 signaling) or type-2 (e.g., based on RRC configuration and L1 signaling for activation/deactivation).

In addition to control information, one or more REs 306 (e.g., within the data region 314) may be allocated for user data or traffic data. Such traffic may be carried on one or more traffic channels, such as, for a DL transmission, a PDSCH; or for an UL transmission, a physical uplink shared channel (PUSCH). In some examples, one or more REs 306 within the data region 314 may be configured to carry SIBs (e.g., SIB1), carrying system information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
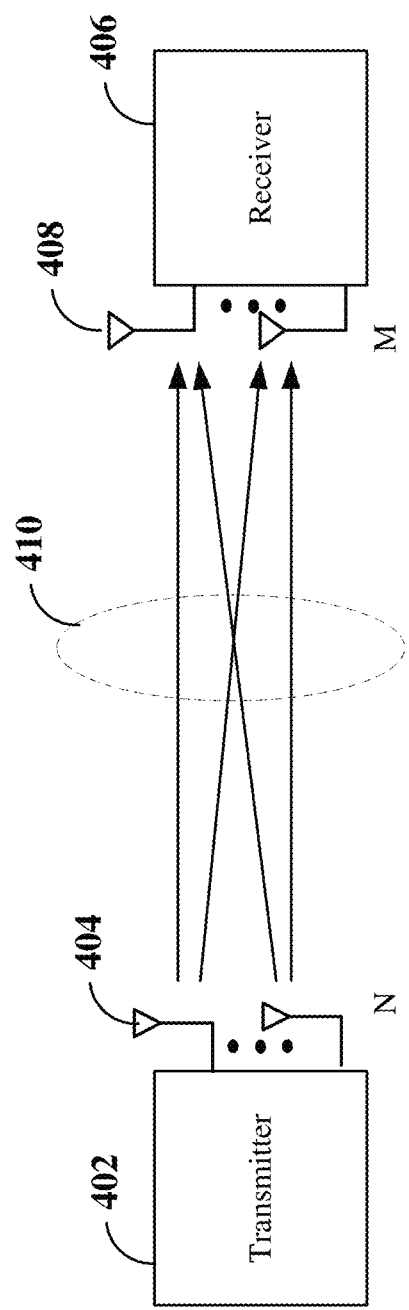
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In some examples, to select a particular beam for communication with a UE, the base station may transmit a reference signal, such as an SSB or channel state information reference signal (CSI-RS), on each of a plurality of beams (SSB beams) in a beam-sweeping manner The UE may measure the reference signal received power (RSRP), reference signal received quality (RSRQ) or SINR on each of the beams and transmit a beam measurement report to the base station indicating the RSRP of each of the measured beams. The base station may then select the particular beam for communication with the UE based on the beam measurement report. In other examples, when the channel is reciprocal, the base station may derive the particular beam to communicate with the UE based on uplink measurements of one or more uplink reference signals, such as a sounding reference signal (SRS).

In order to gain access to a cell, a UE may perform a random-access procedure over a physical random-access channel (PRACH). The UE may identify a random-access search space including PRACH resources for initiating a RACH procedure from the SIB1. For example, a random-access process may be commenced after a UE acquires a cell and determines occurrence of a RACH occasion (e.g., PRACH resources) after reading SSB and a SIB1. The SSB provides the initial system information (SI), and the SIB1 (and other SIB blocks) provide the remaining minimum SI (RMSI). For example, the PBCH MIB of the SSB may carry a first part of the SI that a user equipment (UE) needs in order to access a network. The SIBs (e.g., SIB1 and SIB2) can carry the RMSI that a UE needs to gain access to the network.

RACH procedures may be performed in various scenarios, such as loss of uplink synchronization, lack of available PUCCH resources, scheduling request failure, and other use cases. In addition, a RACH procedure may be contention-based or contention-free and may include a 2-step RACH process (contention-based or contention-free), a 3-step RACH process (contention-free), or a 4-step RACH process (contention-based).

The radio protocol architecture for a radio access network, such as the radio access network 104 shown in FIG. 1 and/or the radio access network 200 shown in FIG. 2, may take on various forms depending on the particular application. An example of a radio protocol architecture for the user and control planes is illustrated FIG. 5.

Figure 5:
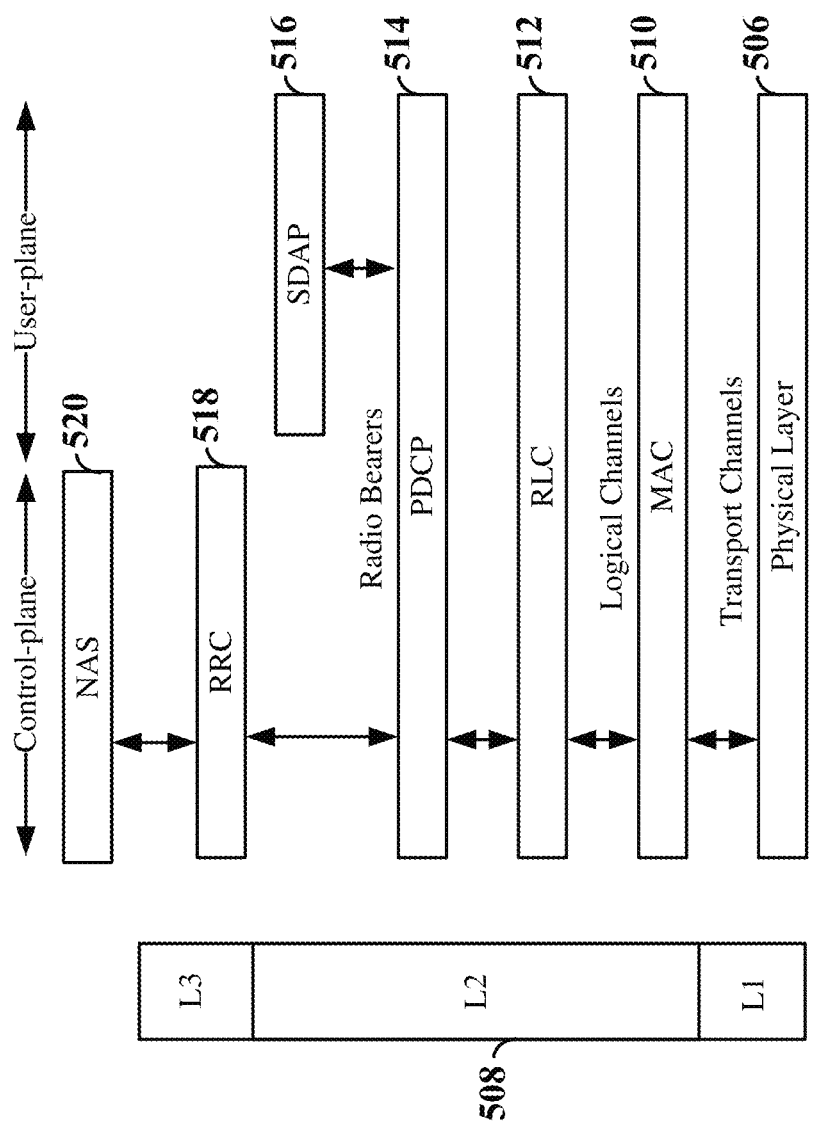
FIG. 5 is a block diagram illustrating a radio protocol architecture for the user and control planes according to some aspects.

As illustrated in FIG. 5, the radio protocol architecture for the UE and the base station includes three layers: layer 1 (L1), layer 2 (L2), and layer 8 (L8). L1 is the lowest layer and implements various physical layer signal processing functions. L1 will be referred to herein as the physical layer 506. L2 508 is above the physical layer 506 and is responsible for the link between the UE and base station over the physical layer 506.

In the user plane, the L2 layer 508 includes a media access control (MAC) layer 510, a radio link control (RLC) layer 512, a packet data convergence protocol (PDCP) 514 layer, and a service data adaptation protocol (SDAP) layer 516, which are terminated at the base station on the network side. Although not shown, the UE may have several upper layers above the L2 layer 508 including at least one network layer (e.g., IP layer and user data protocol (UDP) layer) that is terminated at the User Plane Function (UPF) on the network side and one or more application layers.

The SDAP layer 516 provides a mapping between a 5G core (5GC) quality of service (QoS) flow and a data radio bearer and performs QoS flow ID marking in both downlink and uplink packets. The PDCP layer 514 provides packet sequence numbering, in-order delivery of packets, retransmission of PDCP protocol data units (PDUs), and transfer of upper layer data packets to lower layers. PDU's may include, for example, Internet Protocol (IP) packets, Ethernet frames and other unstructured data (i.e., Machine-Type Communication (MTC), hereinafter collectively referred to as "packets"). The PDCP layer 514 also provides header compression for upper layer data packets to reduce radio transmission overhead, security by ciphering the data packets, and integrity protection of data packets. A PDCP context may indicate whether PDCP duplication is utilized for a unicast connection.

The RLC layer 512 provides segmentation and reassembly of upper layer data packets, error correction through automatic repeat request (ARQ), and sequence numbering independent of the PDCP sequence numbering. An RLC context may indicate whether an acknowledged mode (e.g., a reordering timer is used) or an unacknowledged mode is used for the RLC layer 512. The MAC layer 510 provides multiplexing between logical and transport channels. The MAC layer 510 is also responsible for allocating the various radio resources (e.g., resource blocks) in one cell among the UEs and for HARQ operations. A MAC context may enable, for example, a HARQ feedback scheme, resource selection algorithms, carrier aggregation, beam failure recovery, or other MAC parameters for a unicast connection. The physical layer 506 is responsible for transmitting and receiving data on physical channels (e.g., within slots). A PHY context may indicate a transmission format and a radio resource configuration (e.g., bandwidth part (BWP), numerology, etc.) for a unicast connection.

In the control plane, the radio protocol architecture for the UE and base station is substantially the same for L1 506 and L2 508 with the exception that there is no SDAP layer in the control plane and there is no header compression function for the control plane. The control plane also includes a radio resource control (RRC) layer 518 in L8 and a higher Non Access Stratum (NAS) layer 520. The RRC layer 518 is responsible for establishing and configuring signaling radio bearers (SRBs) and data radio bearers (DRBs) between the base station the UE, paging initiated by the 5GC or NG-RAN, and broadcast of system information related to Access Stratum (AS) and Non Access Stratum (NAS). The RRC layer 518 is further responsible for QoS management, mobility management (e.g., handover, cell selection, inter-RAT mobility), UE measurement and reporting, and security functions. The NAS layer 520 is terminated at the AMF in the core network and performs various functions, such as authentication, registration management, and connection management.

Figure 6:
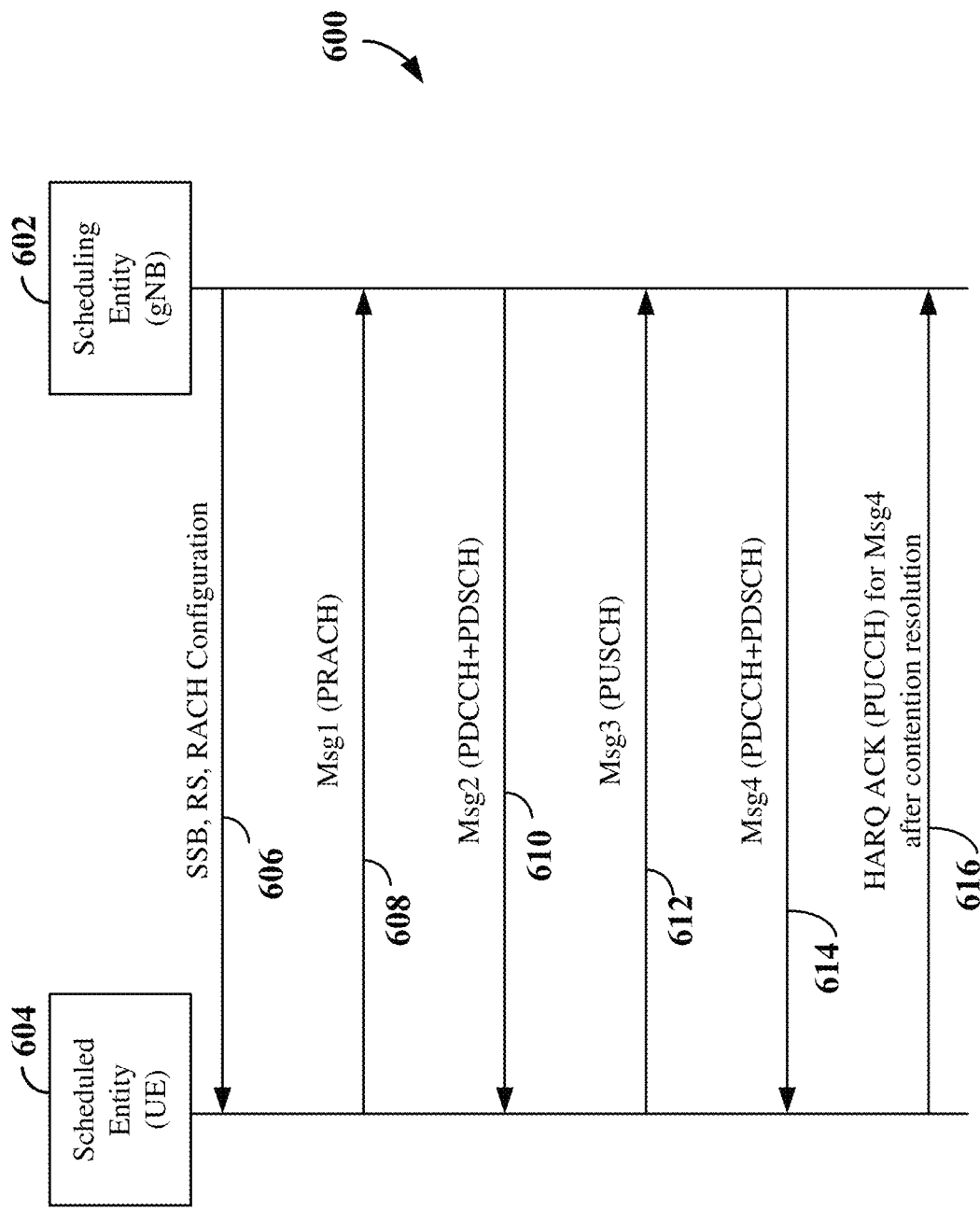
FIG. 6 is a diagram illustrating an example of a four-step random-access channel (RACH) procedure according to some aspects.

FIG. 6 is a diagram illustrating an example of a four-step random-access channel (RACH) procedure 600 according to some aspects. The scheduling entity 602 may correspond, for example, to a gNB or any of the scheduling entities shown in FIGS. 1 and/or 2. In addition, the scheduled entity 604 may correspond, for example, to a UE or any of the scheduled entities shown in FIGS. 1 and/or 2.

The random-access procedure 600 shown in FIG. 6 is initiated when the scheduled entity 604 first receives the SSB, RS and RACH configuration 606, as mentioned above. The scheduled entity 604 may then randomly select a preamble from an available set of preambles within the cell served by the scheduling entity 602 as indicated in the RACH configuration, and transmit the selected preamble to the scheduling entity 602 in a RACH preamble message 608 (msg1). In an example, the scheduled entity 604 may select from 64 possible preamble sequences for inclusion in the RACH preamble message 606. The msg1 608 may be transmitted by the scheduled entity 604 over a selected PRACH resource with power ramping. The selected PRACH resource may include supplementary uplink resources or normal uplink resources. Here, supplementary uplink resources include lower frequency resources than normal uplink resources. Thus, supplementary uplink resources and uplink resources each correspond to a different respective uplink frequency band. The msg1 608 may further be communicated on a beam selected by the scheduled entity 604 based on beam measurements (e.g., RSRP/RSRQ/SINR) performed by the scheduled entity 604. The beam may correspond, for example, to an SSB beam.

If the preamble is successfully detected by the scheduling entity 602, the scheduling entity 602 transmits a random-access response (RAR) message 610 (msg2) including a PDCCH and PDSCH to the scheduled entity 604. If no msg2 (RAR) 610 is received within a RAR window, the scheduled entity 604 may retransmit msg1 608 with power boost. The msg2 610 (PDCCH+PDSCH) includes an identifier of the preamble sent by the scheduled entity 604, a Timing Advance (TA), a temporary cell radio network temporary identifier (TC-RNTI) or random-access (RA) RNTI for the scheduled entity 604 and a grant of assigned uplink (UL) resources. The PDCCH in msg2 610 may be scrambled with the RA-RNTI, which is a function of a RACH occasion (RO) (e.g., time-frequency resources allocated for RACH msg1) that the scheduled entity 604 used to send msg1 608. A medium access control-control element (MAC-CE) within the PDSCH provides an acknowledgement of the reception of msg1 608 and the UL grant. To receive msg2 610, the scheduled entity 604 may monitor DCI 1_0 for the PDCCH scrambled with the RA-RNTI corresponding to the RO used by the scheduled entity 604 to transmit msg1 608, and if detected, proceeds with PDSCH decoding. Upon receipt of the RAR message 610, the scheduled entity 604 compares the preamble ID to the preamble sent by the scheduled entity in the RACH preamble message 608. If the preamble ID matches the preamble sent in the RACH preamble message 608, the scheduled entity 604 applies the timing advance and starts a contention resolution procedure.

Since the preamble may be selected randomly by the scheduled entity, if another scheduled entity selects the same preamble in the same RO, a collision may result between the two scheduled entities. Any collisions may then be resolved using a contention resolution procedure. During contention resolution, the scheduled entity 604 transmits an uplink message (msg3) 612 such as a PUSCH on the common control channel (CCCH) using the TA and assigned uplink resources in the PDSCH of msg2 610. In an example, the uplink message 612 is a Layer 2/Layer 3 (L2/L3) message, such as a Radio Resource Control (RRC) Connection Request message. The uplink message 612 includes an identifier of the scheduled entity 604 (scheduled entity-ID) for use by the scheduling entity in resolving any collisions. Although other scheduled entities may transmit colliding uplink messages utilizing the TA and assigned uplink resources, these colliding uplink messages will likely not be successfully decoded at the scheduling entity since the colliding uplink messages were transmitted with TAs that were not intended for those scheduled entities.

Upon successfully decoding the uplink message, the scheduling entity 602 transmits a contention resolution message 614 (msg4) to the scheduled entity 604. The contention resolution message 614 may be, for example, an RRC-Connection Setup message. In addition, the contention resolution message 614 includes the identifier of the scheduled entity 604 that was received in the uplink message 612. The scheduled entity 604, upon receiving its own identity back in the contention resolution message 614, concludes that the random-access procedure was successful and completes the RRC connection setup process. Any other scheduled entity receiving the RRC-Connection Setup message with the identity of the scheduled entity 604 will conclude that the random-access procedure failed and re-initialize the random-access procedure. As mentioned above msg4 614 may have a PDCCH control component and a PDSCH payload component.

With the contention resolved, data may be communicated between the scheduled entity 604 and the scheduling entity 602 with the exchange of payloads in PUSCH and PDSCH messages. The scheduled entity may then transmit HARQ feedback (e.g., ACK/NACK) for the PDSCH payloads within, for example, PUCCH messages 616.

Figure 7:
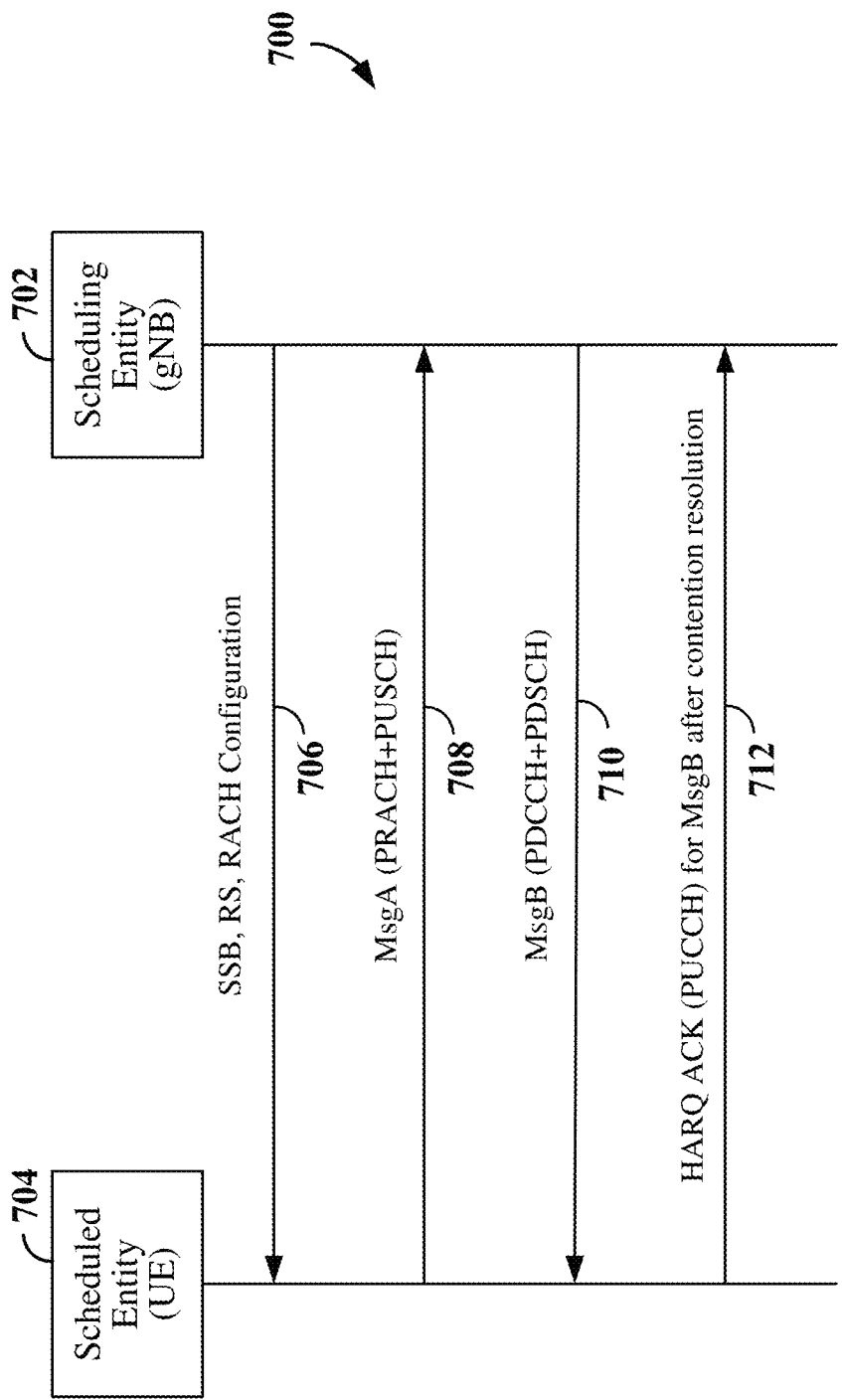
FIG. 7 is a diagram illustrating an example two-step RACH procedure according to some aspects.

FIG. 7 is a diagram illustrating an example two-step RACH procedure according to some aspects, where the four-step procedure 600 can be compressed into the two-step random-access procedure 700 illustrated in FIG. 7. The two-step random-access procedure 700 reduces overhead and latency associated with control signaling by removing a transmission in each direction between the scheduled entity 704 and the scheduling entity 702 (e.g., gNB). In comparison to FIG. 6, the two-step random-access procedure 700 uses the same SSB, RS and RACH configuration messages 706 as in the 4-step RA procedure described above. The 2 steps commence with a transmission by the scheduling entity 704 of a msgA 708 that includes the RACH preamble message and the uplink message of the contention-based random-access procedure shown in 600. Here, the uplink message may be a scheduled PUSCH transmission sent over a PUSCH resource and the RACH preamble message may be sent over a selected PRACH resource. The scheduling entity 702 responds with a single message (msgB 710) that includes the random-access response and the contention resolution message, similar to msg4 of the 4-step procedure discussed above. This message includes the PDCCH and PDSCH. The scheduled entity 704 responds 712 to msgB with HARQ ACK/NACK in a PUCCH message.

Figure 8:
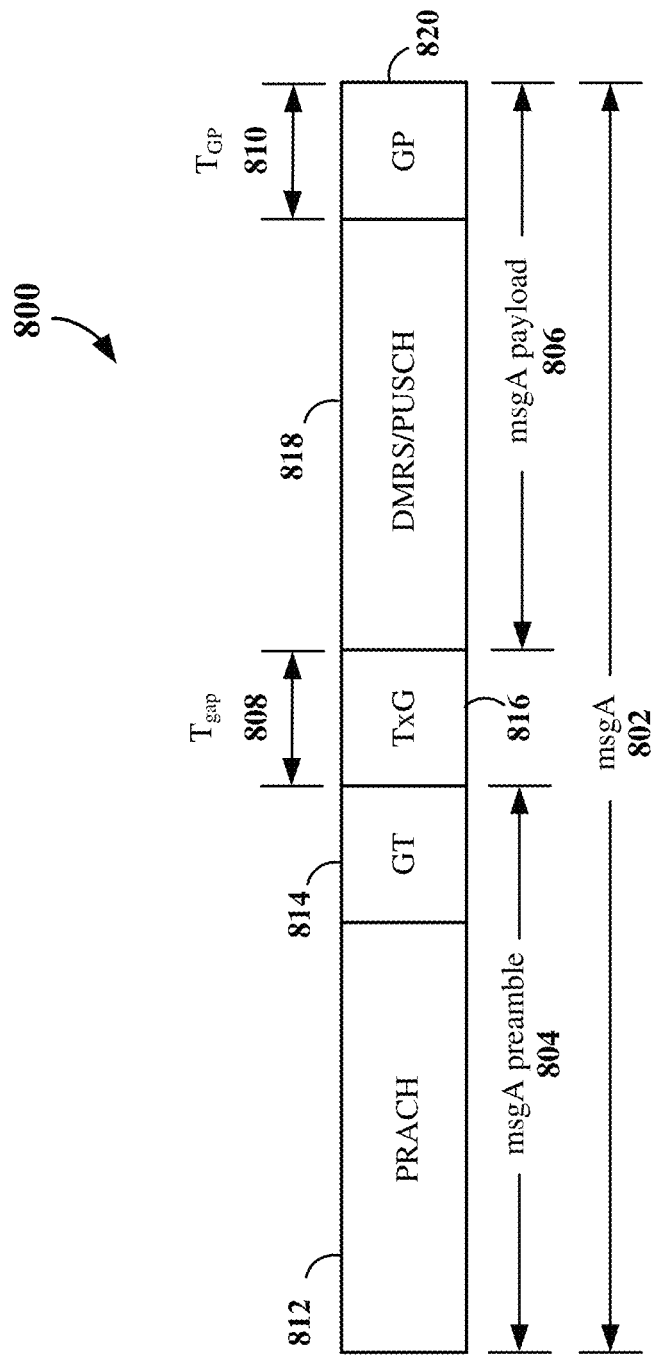
FIG. 8 is a block diagram illustrating an example of a random-access (RA) preamble that may be used in a two-step RACH procedure according to some aspects.

FIG. 8 is a block diagram illustrating an example of a random-access (RA) preamble 802 that may be used in a two-step RACH procedure according to some aspects. Here, the RA preamble 802 is illustrated as msgA, which may be a similar to msgA (708) described above in connection with FIG. 7. In this example, the RA preamble 802 includes a msgA preamble 804, which includes PRACH 812 and a guard time slot 814. The msgA preamble is followed by the msgA payload 806, which includes DMRS/PUSCH 818 and guard period 820, having a configured time period $T_{GP}$ 810. The RA preamble 802 may include TxG slot 816 between the msgA preamble 804 and msgA payload for transmitter antenna gain information over a configured time gap $T_{gap}$ 808.

Figure 9:
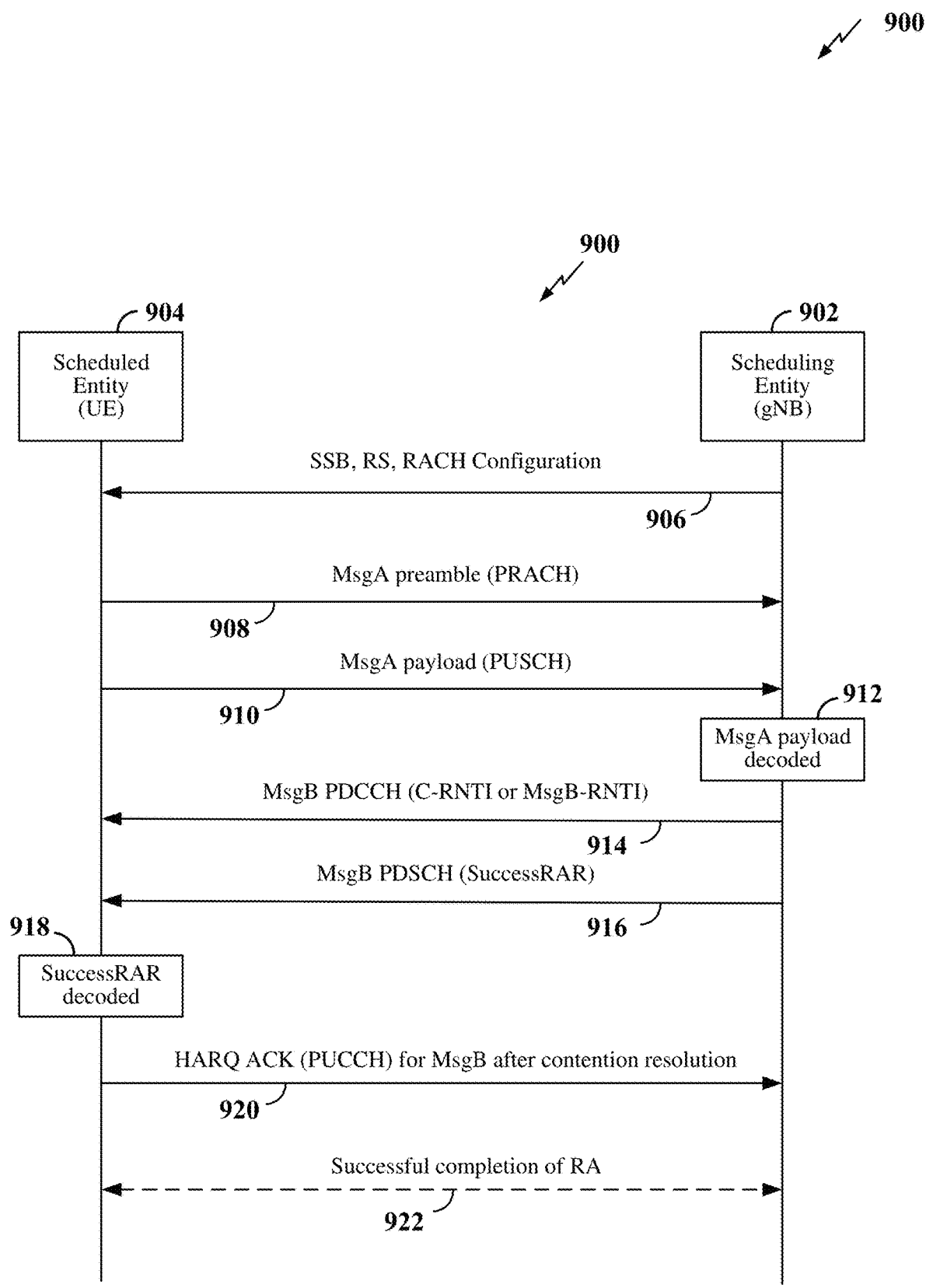
FIG. 9 is a diagram illustrating signaling between a scheduled entity and scheduling entity during a RACH procedure when a RA payload is decoded according to some aspects.

FIG. 9 is a diagram illustrating signaling 900 between a scheduled entity 904 and scheduling entity 902 during a RACH procedure when a RA payload (msgA) is decoded according to some aspects. The example of FIG. 9 is similar to two-step RACH procedure described above in connection with FIG. 7, in that the scheduled entity 904 receives the same SSB, RS and RACH configuration messages in 906. The scheduled entity 904 may then select a preamble from an available set of preambles within the cell served by the scheduling entity 902 as indicated in the RACH configuration, and transmit the selected preamble to the scheduling entity 902 in msgA that includes a PRACH preamble 908 and PUSCH payload transmission 910. The msgA PRACH preambles may be separate from the four-step RACH preambles, but can be transmitted in the same PRACH Occasions (ROs) as the preambles of four-step RACH, or in separate ROs. The PUSCH payload transmissions 910 may be configured into PUSCH Occasions (POs) that span multiple symbols and PRBs with optional guard periods and guard bands between consecutive POs.

In block 912, the scheduling entity 902 may decode the msgA payload and transmit a random-access response (RAR) msgB 914, 916 that may include the detected preamble ID, a time-advance command, a temporary radio network temporary identifier C-RNTI (or msgB-RNTI), and an uplink grant for scheduling a PUSCH, as well as a successRAR over PDSCH (916) to the UE with the contention resolution ID of msgA. In block 918, the scheduled entity 904 decodes successRAR and transmits to the scheduling entity 902 acknowledgement HARQ ACK 920 via PUCCH for msgB after contention resolution, establishing successful completion of RA procedure in 922.

Figure 10:
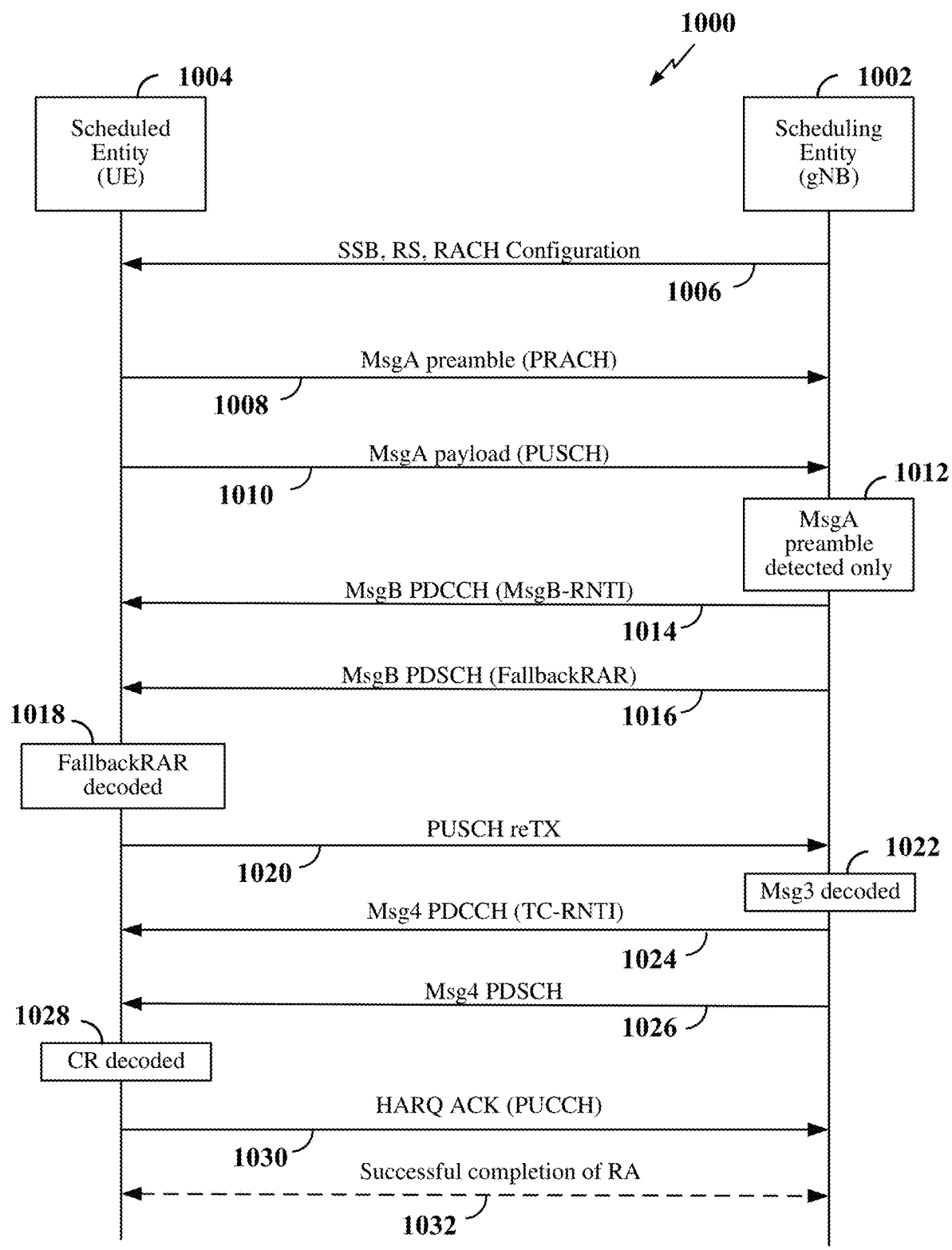
FIG. 10 is a diagram illustrating signaling between a scheduled entity and scheduling entity during a RACH procedure when only a RA preamble is decoded according to some aspects.

FIG. 10 is a diagram illustrating signaling 1000 between a scheduled entity 1004 and scheduling entity 1002 during a RACH procedure when only a RA preamble is decoded according to some aspects. The diagram 1000 is similar to diagram 900 of FIG. 9 in that the scheduled entity 1004 receives SSB, RS and RACH configuration messages in 1006. The scheduled entity 1004 may select a preamble from an available set of preambles within the cell served by the scheduling entity 1002 as indicated in the RACH configuration, and transmit the selected preamble to the scheduling entity 1002 in msgA that includes a PRACH preamble 1008 and PUSCH payload transmission 1010.

In block 1012, the scheduling entity may detect the msgA preamble only (i.e., not the PUSCH payload), resulting in the scheduling entity 1002 transmitting msgB-RNTI over PDCCH 1014 and a fallbackRAR via msgB PDSCH to the scheduled entity 1004 and may also include the RAPID (random-access preamble ID) and an uplink grant for the MsgA PUSCH retransmission. In block 1018, the scheduled entity decodes the fallbackRAR and falls back to four-step RACH with a transmission of msg3 (retransmission of the MsgA PUSCH) in 1020. In block 1022, the scheduling entity 1002 decodes the msg3 and transmits in 1024 a msg4 temporary C-RNTI (TC-RNTI) over a PDCCH resource and a msg4 contention resolution (CR) over a PDSCH resource in 1026. In block 1028, the scheduled entity 1004 decodes the CR and transmits back an acknowledgement HARQ ACK 1030 over a PUCCH resource, resulting in a successful completion of RA in 1032.

In some examples, scheduled entities may be operating in an operating environment that supports reduced-capability NR devices (also known as "NR Light"). NR light devices may be configured with lower device complexity and reduced energy consumption compared what can be provided by traditional NR devices and which, at the same time, have higher requirements in terms of data rates and latency compared to what can be provided with, for example, LTE machine-type communication (MTC) and narrowband internet of things (NB-IoT). In terms of reduced device complexity, NR light devices may be configured with support for reduced number of TX/RX antennas at the device side, reduction of the minimum required device bandwidth and/or support for devices only capable of half-duplex operation (no simultaneous TX/RX) in paired spectrum. In terms of reduced device energy consumption, NR Light devices may be configured with reduced complexity in PDCCH monitoring by reducing the number of required blind decoding, as well as extended discontinuous reception (DRX) functionality. One having ordinary skill in the art will appreciate that the examples in the present disclosure are suited for applications utilizing NR Light, although they may be equally applied in traditional NR configurations as well.

NR Light devices are configured to perform two-step or four-step RACH procedures in an initial bandwidth part (BWP) or active BWP. Utilizing link adaptation, for example, based on CSI/CQI reporting, such techniques may improve the coverage, power and spectral efficiency of NR Light devices when transmitting/receiving in the initial BWP or active BWP. In some examples, the present disclosure discloses the utilization of early reporting of CSI and/or CQI during RACH procedures to improve performance. In some examples, CSI/CQI reporting may be triggered by the downlink control information (DCI) or random-access response (RAR), for example, of msgB in two-step RACH. CSI/CQI reports can be multiplexed with the payload of msgA, the HARQ feedback to msgB or successRAR, or the retransmission of msgA payload scheduled by msgB or fallbackRAR, discussed above. It should be understood by one skilled in the art that the technologies and techniques disclosed herein may also be used in four-step RACH procedure and by NR UE devices.

Figure 11:
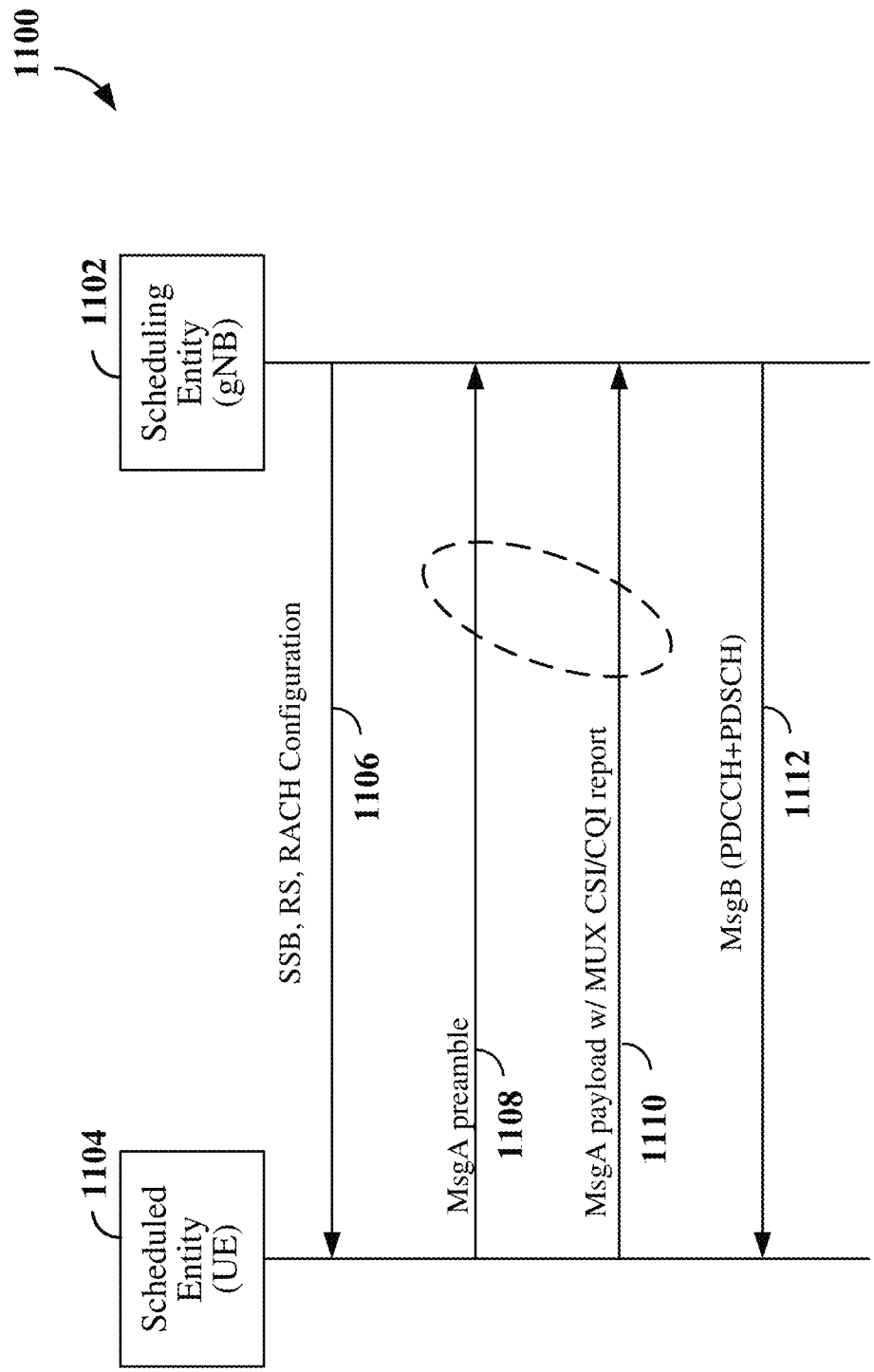
FIG. 11 is a diagram illustrating signaling between a scheduled entity and scheduling entity during a RACH procedure when CSI/CQI reporting is multiplexed with an RA preamble in a RA payload according to some aspects.

FIG. 11 is a diagram illustrating signaling 1100 between a scheduled entity 1104 and scheduling entity 1102 during a RACH procedure when CSI/CQI reporting is multiplexed in an RA (msgA) payload according to some aspects. Similar to the examples above, the scheduled entity 1104 receives SSB, RS and RACH configurations in 1106. In this example, before the scheduled entity 1004 initiates msgA transmission in a two-step RACH procedure (contention free or contention based), it should first obtain the RACH configuration information from system information or dedicated RRC signaling. In some examples, the scheduled entity measures the reference signal received power (RSRP) of SSB, CSI-RS or other reference signals. After obtaining the measurements, the scheduled entity may then select a specific msgA PUSCH configuration and determine the PRACH preamble and PUSCH resources used for msgA transmission. From here, the scheduled entity 1104 can multiplex (shown as dotted circle in the figure) the CSI/CQI report with msgA PUSCH (e.g. CCCH message, C-RNTI, user plane/control plane data, etc.), and select an appropriate msgA PUSCH configuration (e.g. transport block size (TB S)) to transmit the msgA preamble 1108 and msgA payload 1110 containing the multiplexed CSI/CQI report. In one example, the scheduled entity maps a CSI/CQI report to a MAC-CE, which is multiplexed with other MAC-CEs transmitted by msgA PUSCH (1110). After receiving the multiplexed signals, the scheduling entity responds with RAR msgB 1112. In some examples, multiplexing the CSI report with the random-access message is done either by puncturing resource elements (RE) of the PUSCH or by rate matching.

Figure 12:
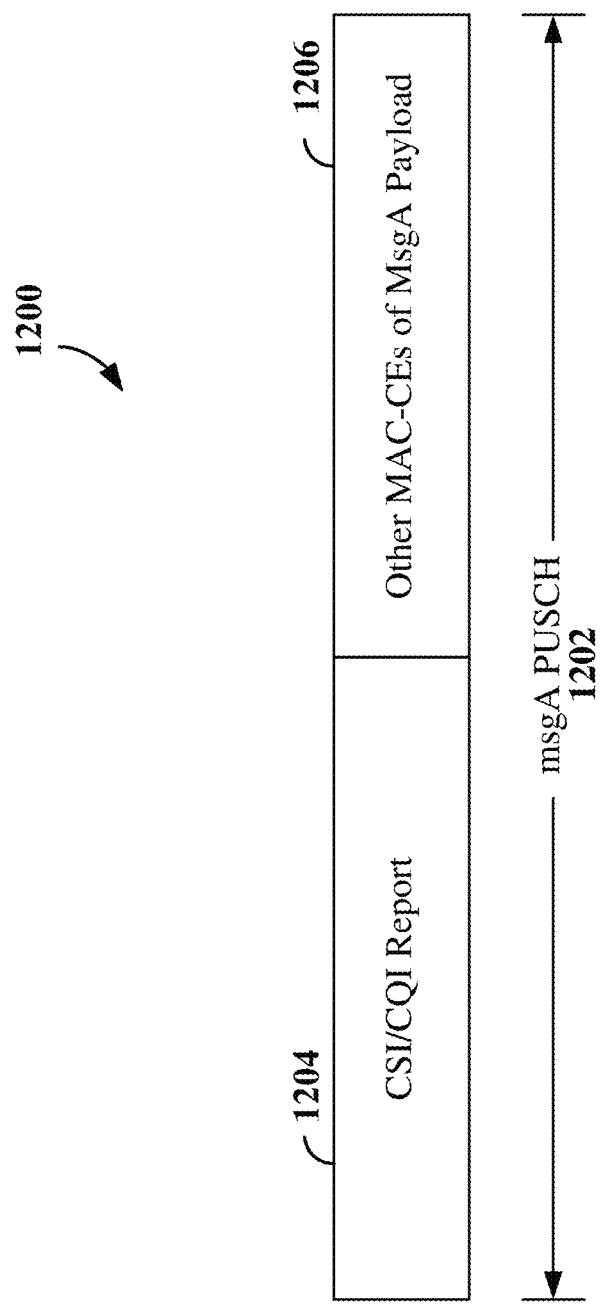
FIG. 12 is a block diagram illustrating a RA payload including a multiplexed CSI/CQI report according to some aspects.
Figure 13:
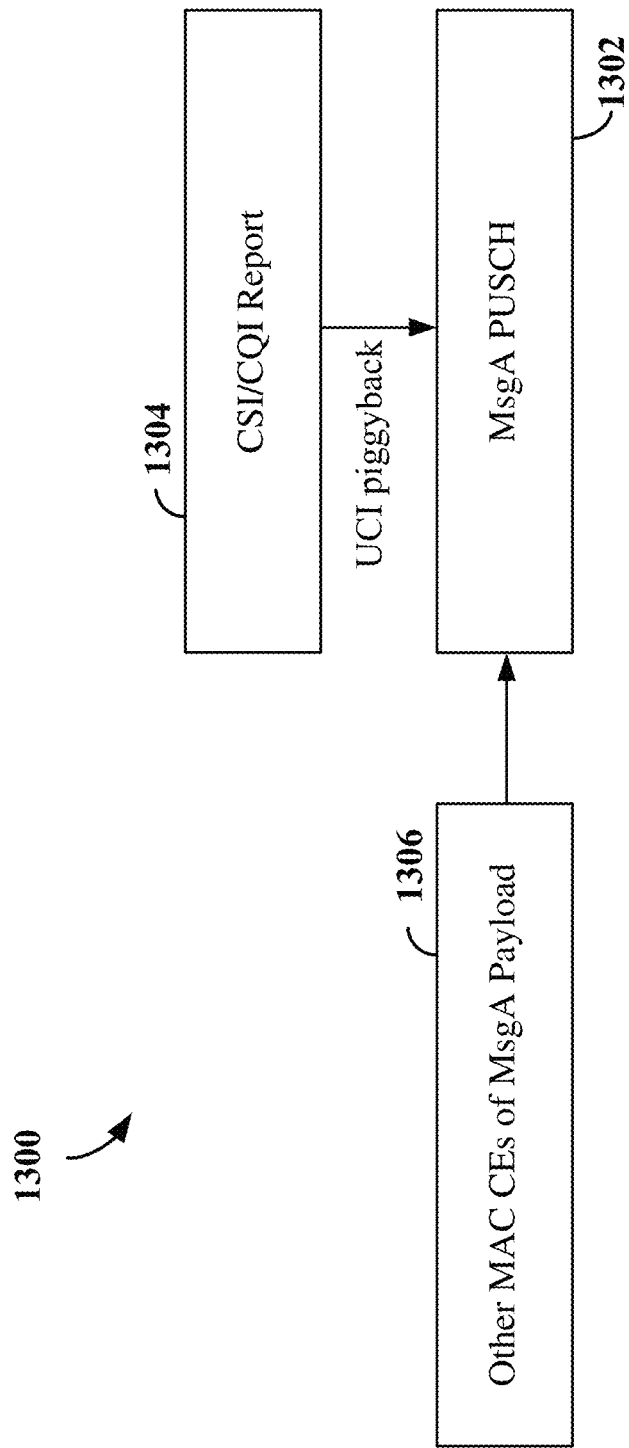
FIG. 13 is another block diagram illustrating a multiplexed CSI/CQI report according to some aspects.

In the example of FIG. 11, the triggering of a CSI/CQI report in the scheduled entity can be based on one or more criteria configured by the network and signaled in SI/RRC. For example, triggering may be based on a RSRP threshold configured by the network. If RSRP measurements are equal to or greater than a threshold, the CSI/CQI report is transmitted. If not, a CSI/CQI report is not transmitted. Alternately or in addition, triggering may be based on msgA transport block size (TBS) and/or the scheduled entity's buffer status. If the buffered data size, plus the CSI/CQI report size is equal or less than TBS of msgA, a CSI/CQI report is transmitted. Otherwise, a CSI/CQI report is not transmitted FIG. 12 is a block diagram 1200 illustrating a RA payload (msgA PUSCH 1202) including a multiplexed CSI/CQI report according to some aspects. In this example, the msgA PUSCH 1202 includes a CSI/CQI report 1204 that is mapped to MAC-CEs and multiplexed with other MAC-CEs of msgA payload 1206 (see FIG. 14). FIG. 13 is another block diagram 1300 illustrating a multiplexed CSI/CQI report 1304 according to some aspects. In this example, the CSI/CQI report 1304 is mapped to uplink control information (UCI), which may be multiplexed with msgA PUSCH 1302 and other MAC-CEs of msgA payload 1306 (see FIG. 15). In some examples, multiplexing the CSI report with the random-access message is done either by puncturing resource elements (RE) of the PUSCH or by rate matching. In some examples, UCI piggybacking may be used for the CSI/CQI report 1304 where a scheduled entity receives a downlink control message that may include a grant for an uplink shared channel (e.g., a physical uplink shared channel (PUSCH)) and also may include an indication of a component carrier (CC) for transmission of UCI. In some cases, the CC scheduled for the uplink shared channel is the CC indicated by grant and the scheduled entity may determine to piggyback the UCI with the shared channel transmission in a single payload. In other cases, the CC scheduled for the uplink shared channel is not the CC indicated by grant and the scheduled entity may then piggyback the UCI with a primary CC (PCC) or a secondary CC (SCC) used for uplink transmission.

In some examples, when a scheduled entity reports CSI/CQI in msgA PUSCH, it can measure SSB, CSI-RS, or other RS transmitted together with RACH configuration information (SI or RRC signaling). The mechanism for triggering the scheduled entity to report CSI/CQI in msgA PUSCH can be based on one or more criteria configured by the network, and is discussed in further detail below.

Figure 14:
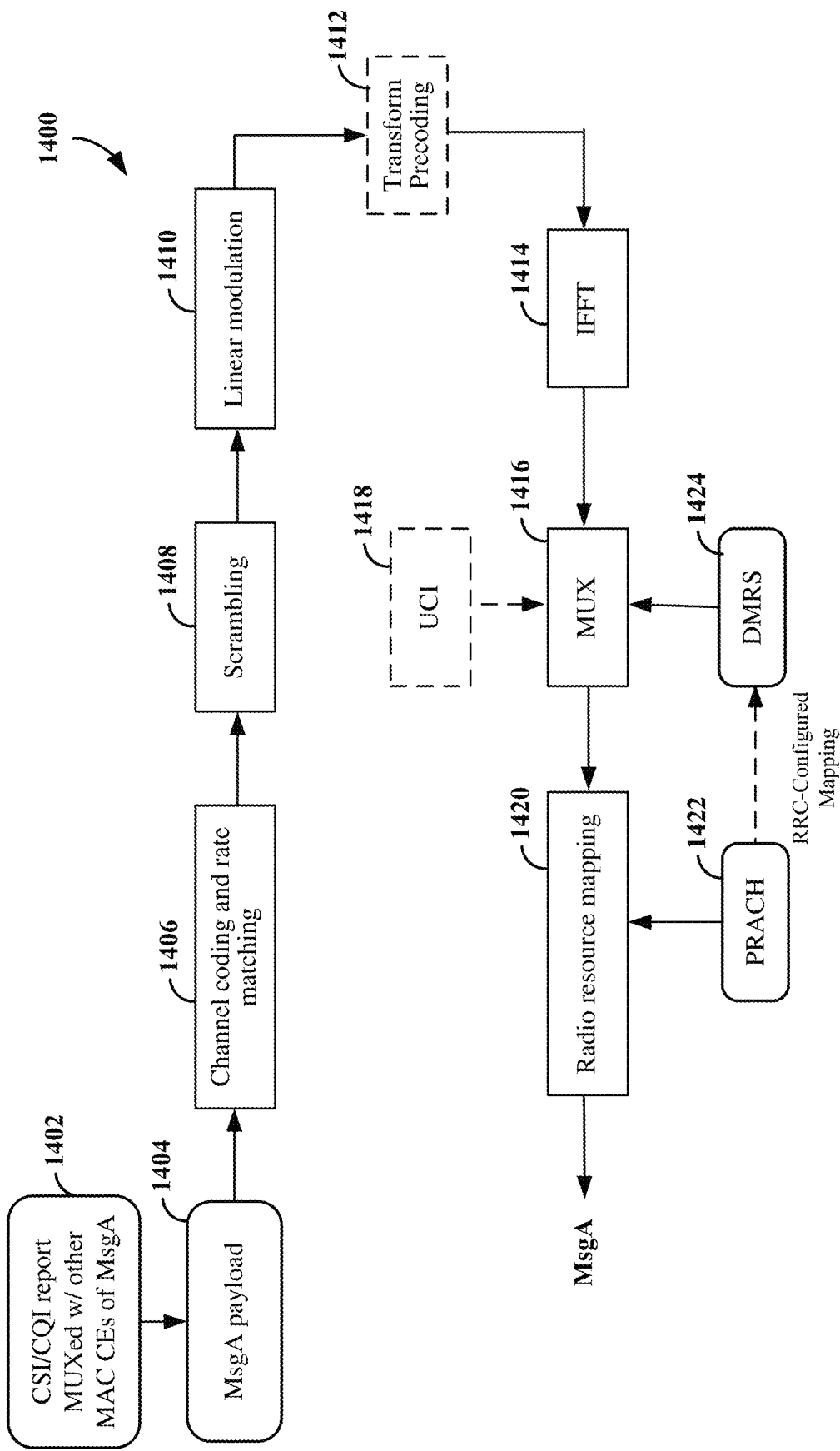
FIG. 14 is a block diagram illustrating physical layer processing for multiplexing a CSI/CQI report with medium access control (MAC) layer control elements (CEs) according to some aspects.

FIG. 14 is a block diagram 1400 illustrating physical layer processing for multiplexing a CSI/CQI report with medium access control (MAC) layer control elements (CEs) according to some aspects. In this example, a CSI/CQI report is multiplexed with other NAC-CEs of msgA 1402 to form a msgA payload 1404, similar to the msgA PUSCH 1202 described above in connection with FIG. 12. The msgA payload 1404 is then subjected to channel coding and rate matching in block 1404. In some examples, the channel coding may include appending a transport block CRC to provide error detection, followed by a low-density parity-check (LDPC) base graph selection. Segmentation of the msgA payload 1404 into code blocks and code block CRC attachment may be performed. Each code block may be individually LDPC encoded. The LDPC coded blocks are then individually rate matched. Next, code block concatenation may be performed to create a codeword for transmission. In block 1408, the contents of the codeword may be scrambled and modulated in block 1410 to generate a block of complex-valued modulation symbols. The symbols are then mapped onto one or several layers via Inverse Fast Fourier Transform (IFFT) 1414. In some examples, PUSCH supports a single codeword that can be mapped up to 4 layers. In case of a single layer transmission only, DFT transform precoding 1412 can optionally be applied if enabled.

The symbols from the IFFT 1414 are then provided to multiplexer 1416, which multiplexes the symbols with demodulation reference signal (DMRS) 1424 and uplink control information (UCI) 1418, if enabled. RRC-configured mapping may be provided by PRACH 1422 for DMRS 1424 as is shown in the figure. The output of multiplexer is then used for radio resource and mapping in block 1420 to output msgA payload (1110). For the layers to antenna ports mapping, both non-codebook-based transmission and codebook-based transmission may be supported in the UL. For each of the antenna ports used for transmission of the physical channel, the symbols may be mapped to RBs. In some examples, the mapping may be done in frequency before time to enable early decoding at the receiver.

Figure 15:
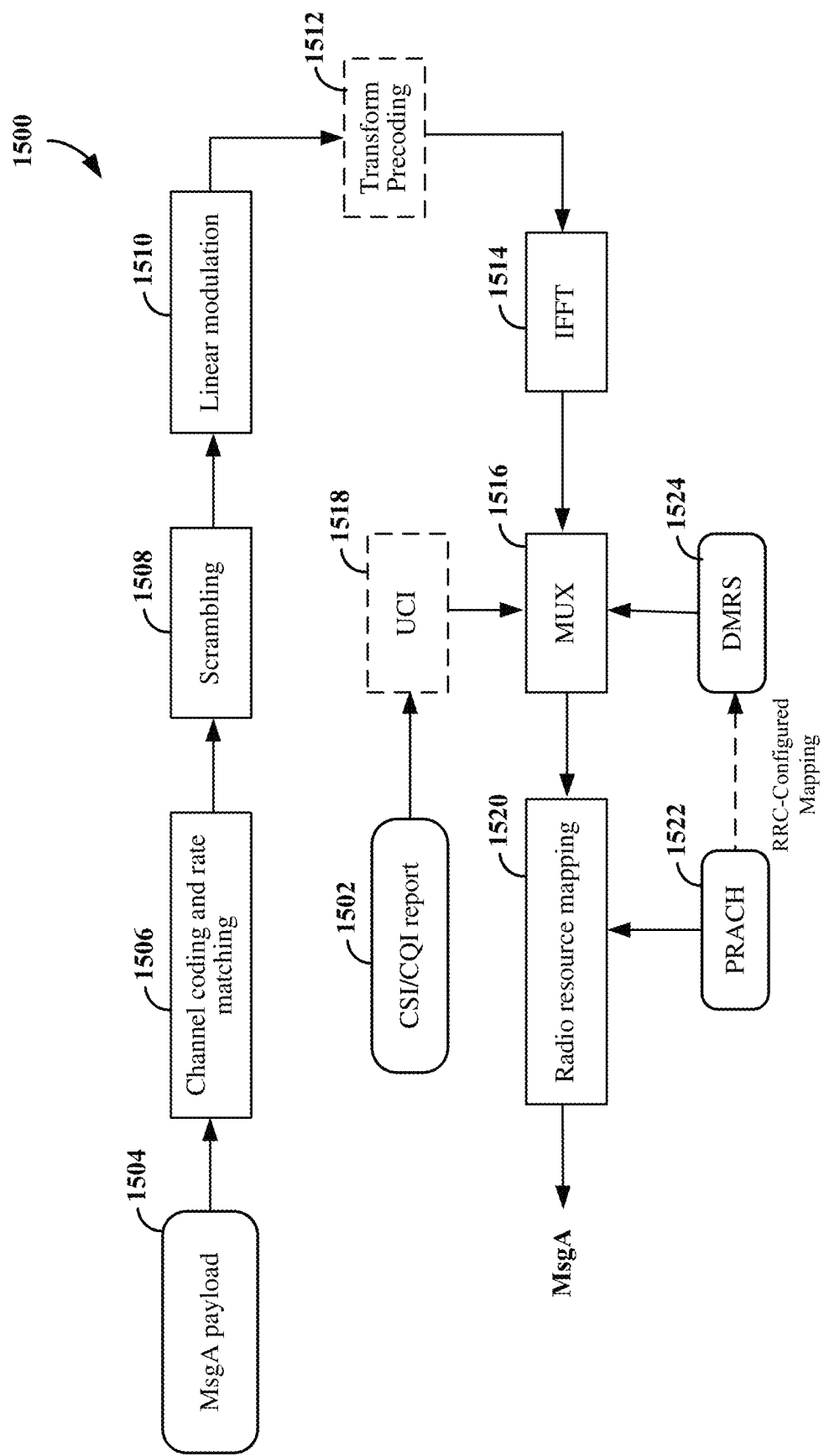
FIG. 15 is a block diagram illustrating physical layer processing for multiplexing a CSI/CQI report with uplink control information (UCI) according to some aspects.

FIG. 15 is a block diagram 1500 illustrating physical layer processing for multiplexing a CSI/CQI report with uplink control information (UCI) according to some aspects. The example of FIG. 15 may be used to form a multiplexed CSI/CQI report with msgA PUSCH and other MAC-CEs of msgA payload shown in FIG. 13. The msgA payload 1504 is subjected to channel coding and rate matching in block 1404. Similar to the example in FIG. 14, the channel coding may include appending a transport block CRC to provide error detection, followed by a low-density parity-check (LDPC) base graph selection. Segmentation of the msgA payload 1504 into code blocks and code block CRC attachment may be performed. Each code block may be individually LDPC encoded. The LDPC coded blocks are then individually rate matched. Next, code block concatenation may be performed to create a codeword for transmission. In block 1508, the contents of the codeword may be scrambled and modulated in block 1510 to generate a block of complex-valued modulation symbols. The symbols are then mapped onto one or several layers via Inverse Fast Fourier Transform (IFFT) 1514. In some examples, PUSCH supports a single codeword that can be mapped up to 4 layers. In case of a single layer transmission only, DFT transform precoding 1512 can optionally be applied if enabled.

The symbols from the IFFT 1514 are then provided to multiplexer 1516, which multiplexes the symbols with demodulation reference signal (DMRS) 1524, where RRC-configured mapping may be provided by PRACH 1522 for DMRS 1524 as is shown in the figure. In this example, CSI/CQI report 1502 is mapped to uplink control information (UCI) 1518 as described above in connection with FIG. 13, and multiplexed with the other symbols in multiplexer 1516. The output of multiplexer is then used for radio resource and mapping in block 1520 to output msgA payload (1110). For the layers to antenna ports mapping, both non-codebook-based transmission and codebook-based transmission may be supported in the UL. For each of the antenna ports used for transmission of the physical channel, the symbols may be mapped to RBs. In some examples, the mapping may be done in frequency before time to enable early decoding at the receiver.

It can be appreciated by one skilled in the art that the present disclosure provides flexibility for CSI/CQI reporting. In the example of FIG. 15, the CSI/CQI report is multiplexed with the msgA payload during construction of msgA, while, in the example of FIG. 14, the CSI/CQI report is multiplexed with the msgA payload before the message payload is constructed. In further examples, CSI/CQI reporting may be configured to occur in PUSCH retransmission (reTX), and may be scheduled/triggered using fallbackRAR.

Figure 16:
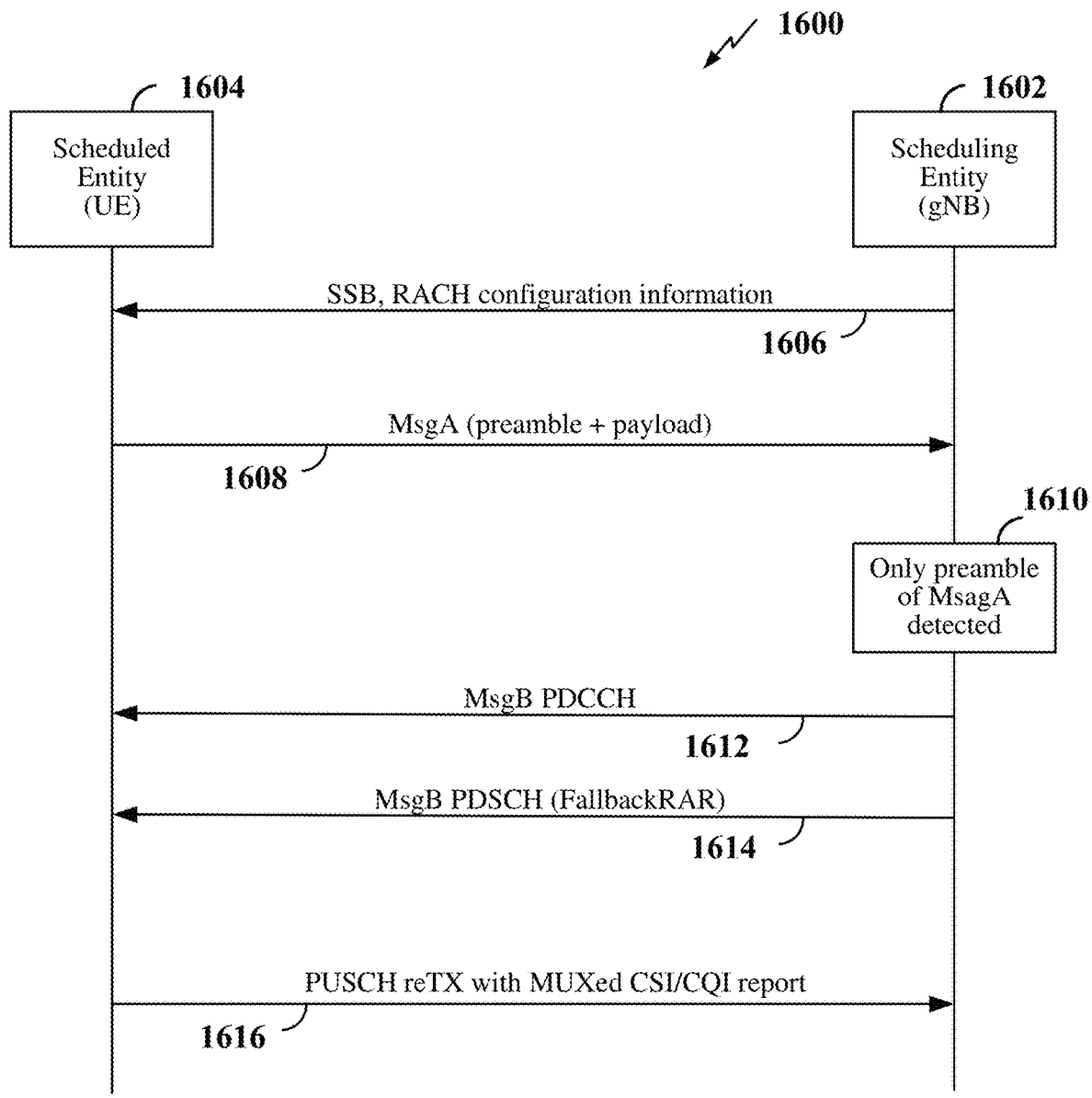
FIG. 16 is a diagram illustrating signaling between a scheduled entity and scheduling entity during a RACH procedure when only a RA preamble is decoded, where CSI/CQI reporting is multiplexed in a physical uplink shared channel (PUSCH) retransmission according to some aspects.

FIG. 16 is a diagram illustrating signaling 1600 between a scheduled entity 1604 and scheduling entity 1602 during a RACH procedure when only a RA preamble (msgA) is decoded, where CSI/CQI reporting is multiplexed in a PUSCH retransmission according to some aspects. Similar to the example in FIG. 10, the scheduled entity 1604 receives SSB, RACH configuration information in 1606 and responds with a msgA preamble and payload in 1608. In block 1610, the scheduling entity 1602 may only detect the preamble of msgA (i.e., not the payload) and may transmit msgB-RNTI over PDCCH 1612 and a fallbackRAR via msgB PDSCH in 1614 to the scheduled entity 1604 and may also include the RAPID (random-access preamble ID) and an uplink grant for the MsgA PUSCH retransmission. After the scheduled entity decodes the fallbackRAR, the scheduled entity provides a PUSCH reTX with a multiplexed CSI/CQI report in 1616. In some examples, the CSI/CQI report is mapped to a MAC CE, which is multiplexed with other MAC CEs retransmitted by PUSCH. In other examples, the CSI/CQI is mapped to a UCI, which is multiplexed with the retransmitted (reTX) PUSCH.

In the example of FIG. 16 the triggering of CSI/CQI reporting may be configured in a plurality of ways. For example, CSI/CQI reports may be triggered by msgB PDCCH, for example, using repurposed and/or reserved bits in the msgB PDCCH payload. Alternately or in addition, CSI/CQI reporting may be triggered by fallbackRAR using, for example, reserved and/or padding bits in the fallback RAR payload.

Figure 17:
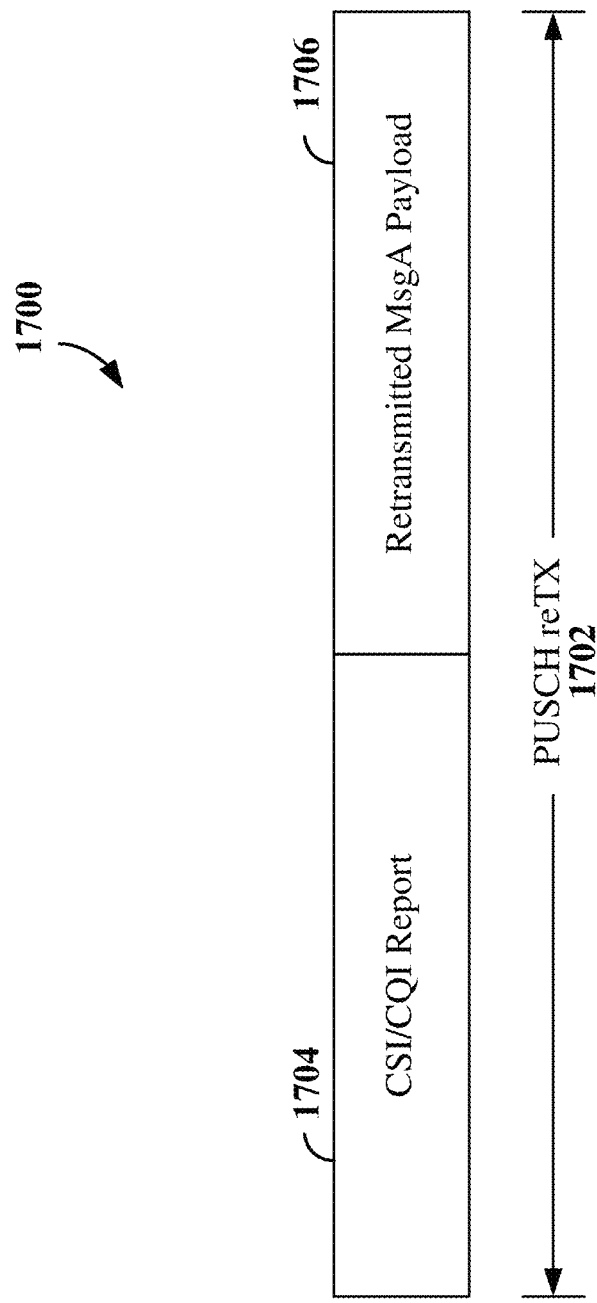
FIG. 17 is a block diagram illustrating a re-transmitted PUSCH during a RACH procedure including a multiplexed CSI/CQI report according to some aspects.
Figure 18:
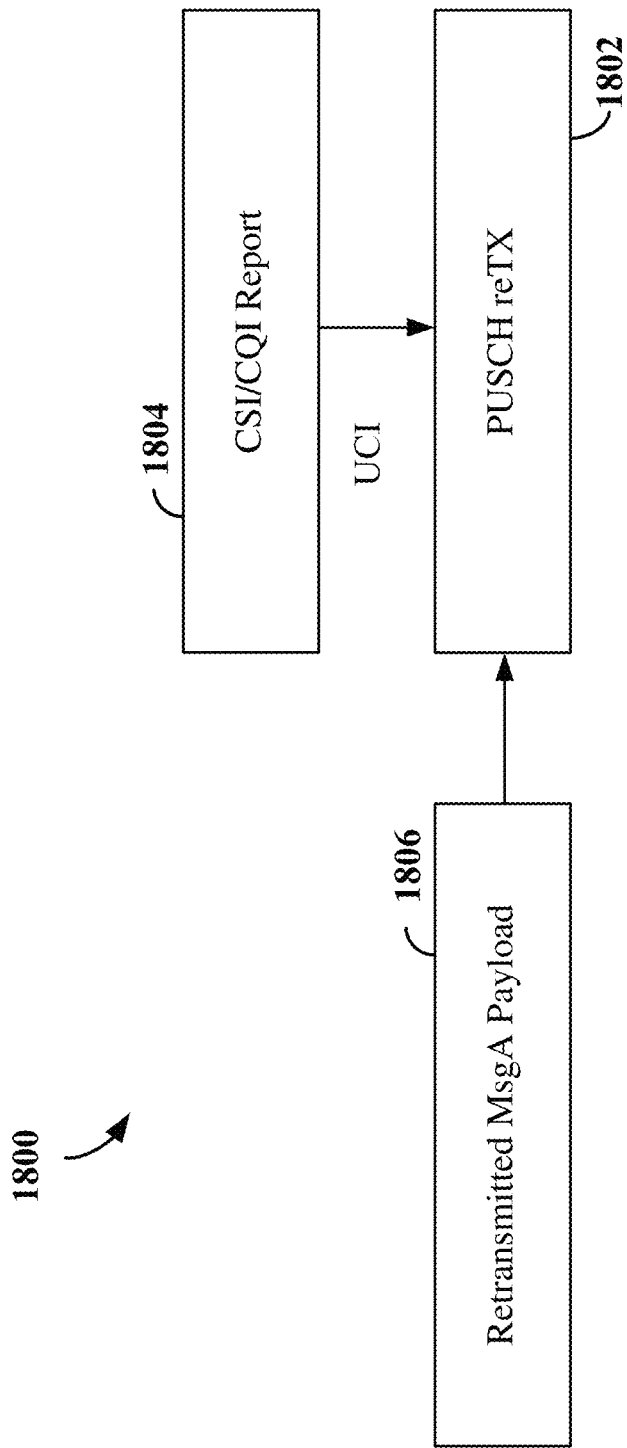
FIG. 18 is another block diagram illustrating a re-transmitted PUSCH during a RACH procedure including a multiplexed CSI/CQI report according to some aspects.

FIG. 17 is a block diagram 1700 illustrating a re-transmitted PUSCH 1702 during a RACH procedure including a multiplexed CSI/CQI report 1704 according to some aspects. In this example, the retransmitted PUSCH 1702 includes the CSI/CQI report mapped to a MAC CE and multiplexed with other MAC CEs in the retransmitted msgA payload 1706. FIG. 18 is another block diagram 1800 illustrating a re-transmitted PUSCH during a RACH procedure including a multiplexed CSI/CQI report according to some aspects. In this example, the CSI/CQI report 1804 is mapped to uplink control information (UCI), which may be multiplexed with retransmitted (reTX) PUSCH 1802 and other MAC-CEs of retransmitted msgA payload 1806 as shown in the figure.

Figure 19:
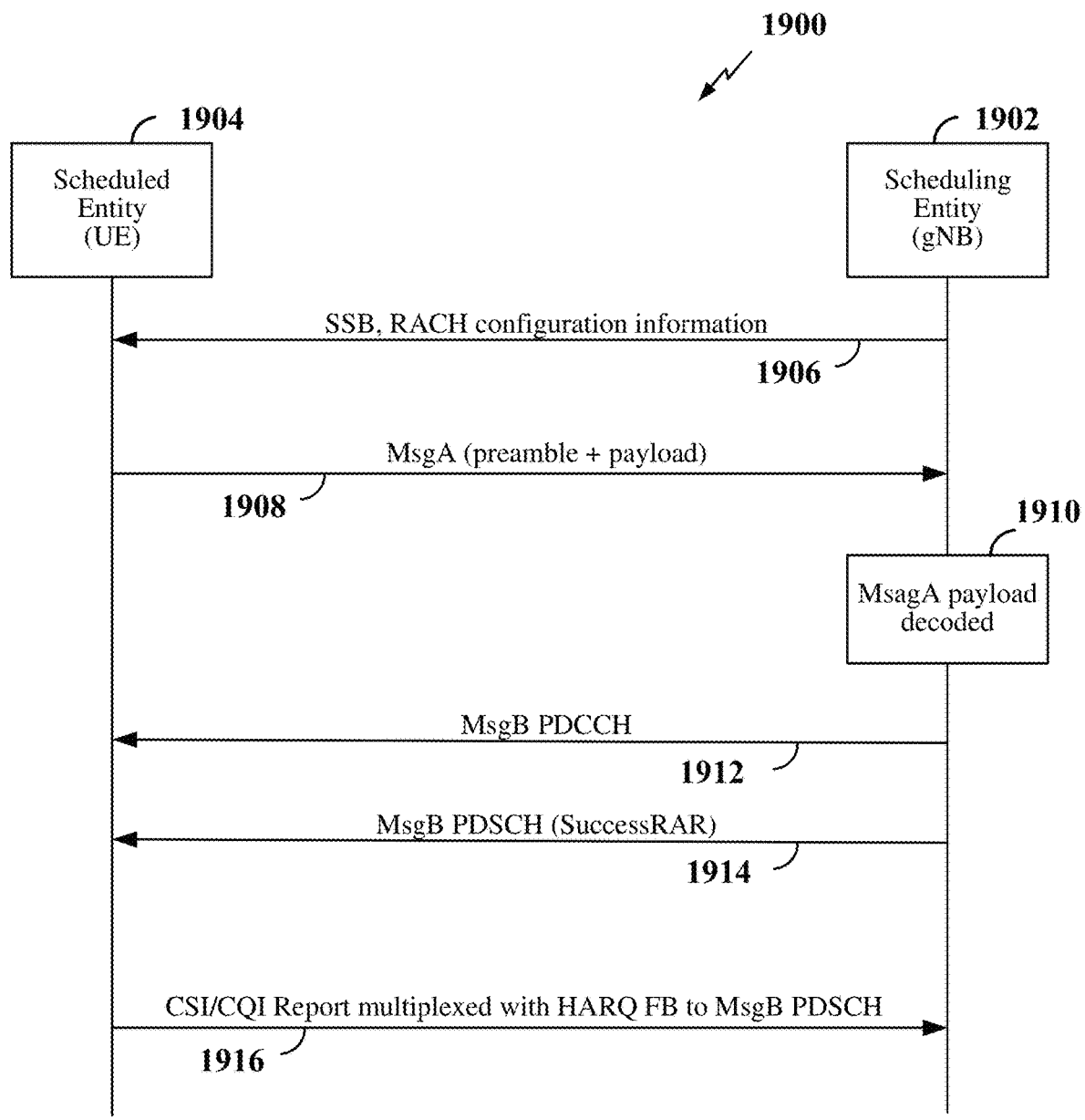
FIG. 19 is a diagram illustrating signaling between a scheduled entity and scheduling entity during a RACH procedure when a RA payload is decoded, where CSI/CQI reporting is multiplexed in a HARQ feedback to a RA response (RAR) according to some aspects.

FIG. 19 is a diagram illustrating signaling 1900 between a scheduled entity 1904 and scheduling entity 1902 during a RACH procedure when a RA payload (msgA) is decoded, and where CSI/CQI reporting is multiplexed in HARQ feedback to a RA response (RAR) according to some aspects. In this example, the scheduled entity 1904 receives SSB, RACH configuration information in 1906 and responds with msgA preamble and payload in 1908. In block 1910, the scheduling entity 1902 decodes the msgA payload and transmits msgB PDCCH 1912 and msgB PDSCH 1914, along with successRAR and an uplink grant for scheduling a PUSCH to the scheduled entity 1904. The scheduled entity 1904 decodes successRAR, triggering a CSI/CQI report multiplexed with HARQ feedback to msgB PDSCH in 1916. In one example, the scheduled entity 1904 can multiplex CSI-CQI with the HARQ feedback, map the multiplexed CSI-CQI/HARQ feedback to a UCI and transmit on PUCCH. In another example, the scheduled entity 1904 can transmit CSI/CQI on PUSCH, which is multiplexed with the UCI carrying HARQ feedback to msgB.

In the example of FIG. 19, the triggering of CSI/CQI reporting may be configured in a plurality of ways. For example, CSI/CQI reports may be triggered by msgB PDCCH using, for example, repurposed and/or reserved bits in the msgB PDCCH. Alternately or in addition, CSI/CQI reporting may be triggered by successRAR using, for example, reserved and/or padding bits in the successRAR.

Figure 20:
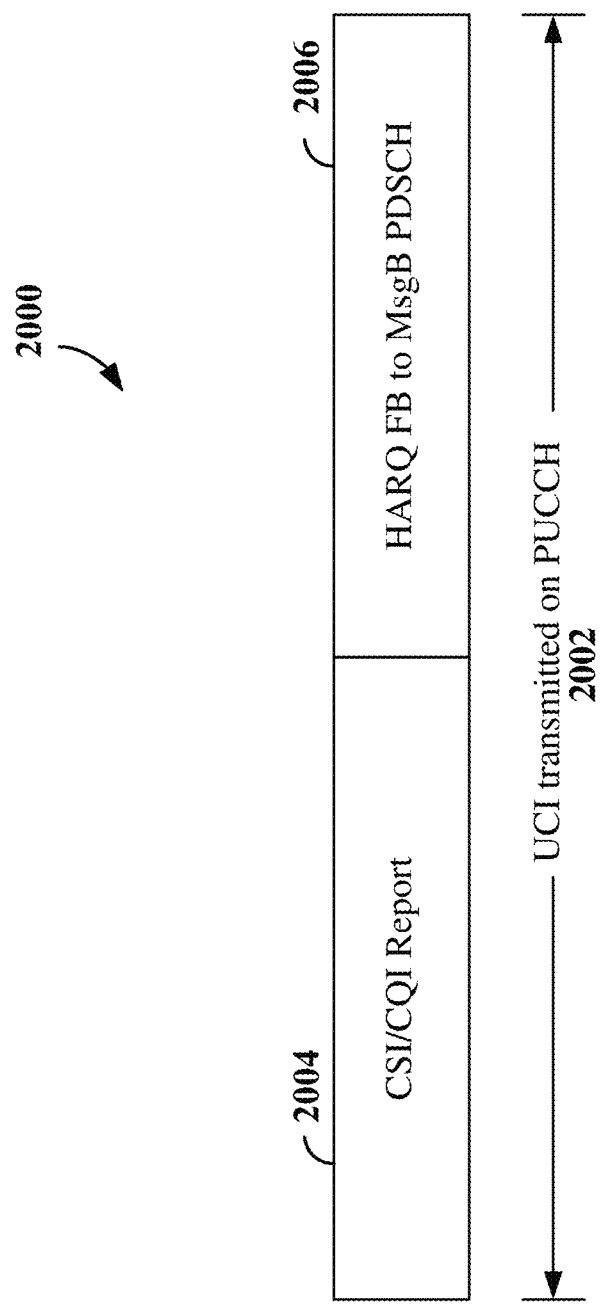
FIG. 20 is a block diagram illustrating a CSI/CQI multiplexed with HARQ feedback mapped to UCI transmitted on a physical uplink control channel (PUCCH) according to some aspects.
Figure 21:
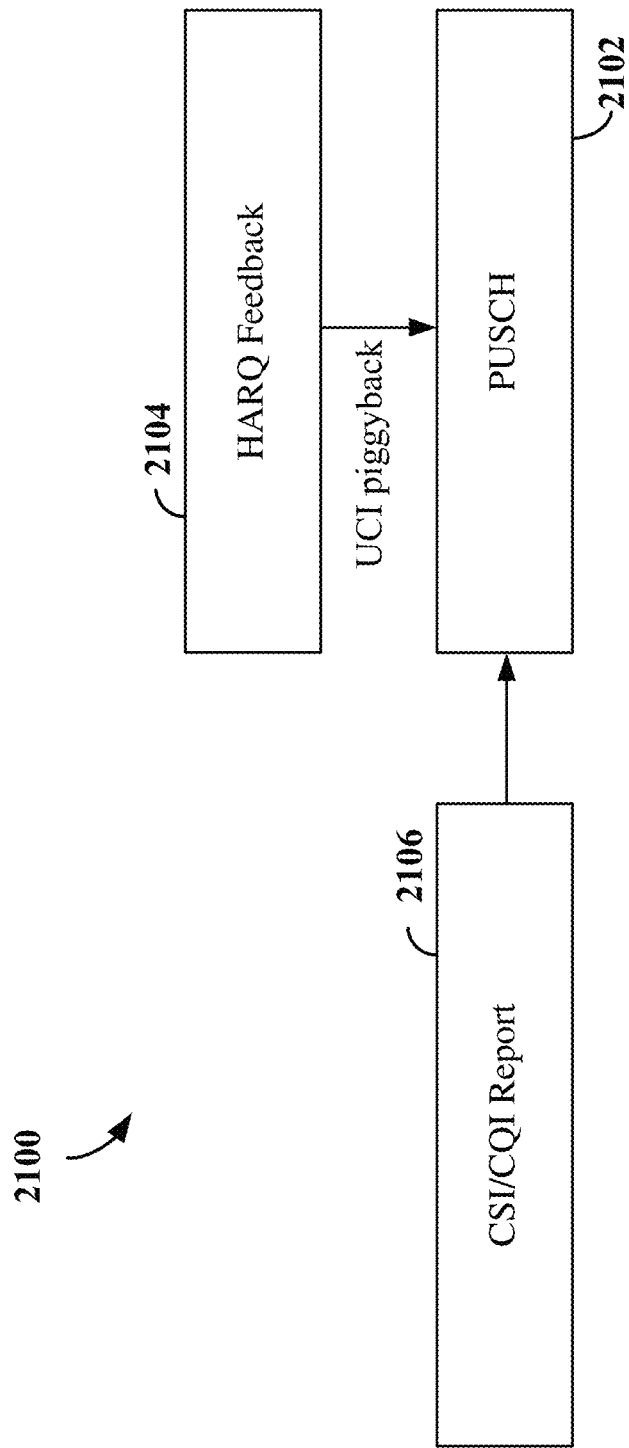
FIG. 21 is another block diagram illustrating a CSI/CQI being transmitted on PUSCH and multiplexed with UCI carrying HARQ feedback according to some aspects.

FIG. 20 is a block diagram illustrating a CSI/CQI multiplexed with HARQ feedback mapped to UCI transmitted on a physical uplink control channel (PUCCH) according to some aspects. In this example, the UCI transmitted on PUCCH 2002 is shown. Here, the CSI-CQI report 2004 is multiplexed with the HARQ feedback to msgB PDSCH 2006, which is mapped to a UCI and transmitted on the PUCCH 2002 as shown in the figure. FIG. 21 is another block diagram 2100 illustrating a CSI/CQI being transmitted on PUSCH and multiplexed with UCI carrying HARQ feedback according to some aspects. In this example, the CSI/CQI report 2106 is mapped to PUSCH 2102, which is multiplexed with the UCI carrying HARQ feedback 2104 to msgB as shown in the figure.

The CSI/CQI measurements in the present disclosure may be configured to measure various reference signals, including, but not limited to, SSB, CSI-RS, additional resource signals (RS) transmitted together with RACH configuration information, and RS scheduled by msgB, among others.

Figure 22:
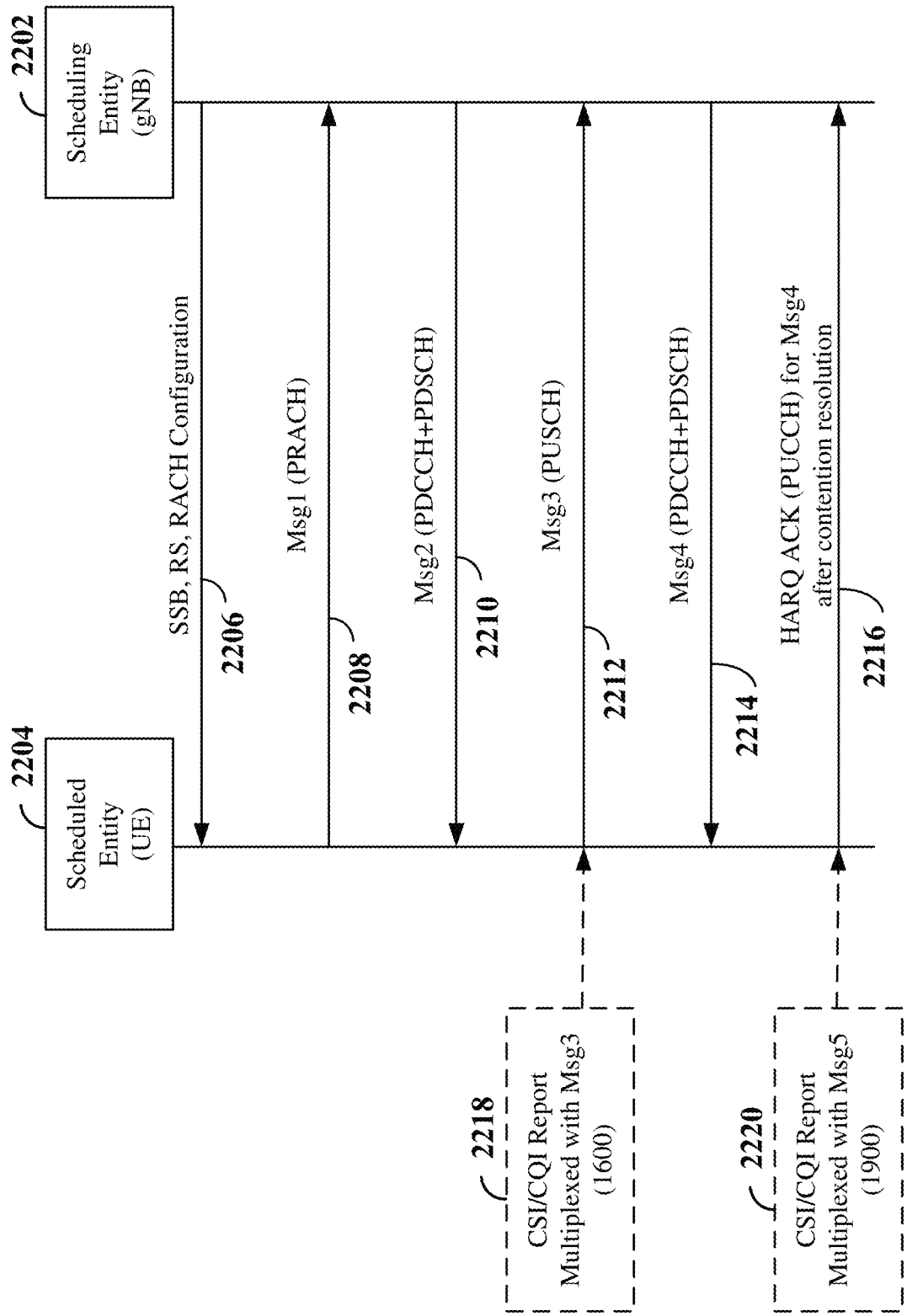
FIG. 22 is a diagram illustrating signaling between a scheduled entity and scheduling entity during a RACH procedure when CSI/CQI reporting is multiplexed to a scheduled PUSCH transmission, or a radio resource control (RRC) connection setup complete message according to some aspects.

While examples discussed above described various configurations for multiplexed CSI/CQI reporting in a two-step RACH operating environment, the same technologies and techniques may be applied to four-step RACH as well. FIG. 22 is a diagram illustrating signaling between a scheduled entity 2204 and scheduling entity 2202 during a RACH procedure when CSI/CQI reporting is multiplexed to a scheduled PUSCH transmission, or a radio resource control (RRC) connection setup complete message according to some aspects. The example of FIG. 22 is similar to the configuration discussed above in connection with FIG. 6, in that the RA procedure is initiated when the scheduled entity 2204 first receives the SSB, RS and RACH configuration 2206, as mentioned above. Then the scheduled entity 2204 randomly selects a preamble and transmits the selected preamble to the scheduling entity 2202 in a RACH preamble message 2208 (msg1) over a selected PRACH resource with power ramping.

If the preamble is successfully detected by the scheduling entity 2202, the scheduling entity 2202 transmits a random-access response (RAR) message 2210 (msg2) including a PDCCH and PDSCH to the scheduled entity 2204. If no msg2 (RAR) 2210 is received within a RAR window, the scheduled entity 2204 may retransmit msg1 2208 with power boost. The msg2 2210 (PDCCH+PDSCH) includes an identifier of the preamble sent by the scheduled entity 2204, a TA, a TC-RNTI or RA RNTI for the scheduled entity 2204 and a grant of assigned uplink (UL) resources. The PDCCH in msg2 2210 may be scrambled with the RA-RNTI. A MAC-CE within the PDSCH provides an acknowledgement of the reception of msg1 2208 and the UL grant. To receive msg2 2210, the scheduled entity 2204 may monitor DCI 1_0 for the PDCCH scrambled with the RA-RNTI corresponding to the RO used by the scheduled entity 2204 to transmit msg1 2208, and if detected, proceeds with PDSCH decoding. Upon receipt of the RAR message 2210, the scheduled entity 2204 compares the preamble ID to the preamble sent by the scheduled entity in the RACH preamble message 2208. If the preamble ID matches the preamble sent in the RACH preamble message 2208, the scheduled entity 2204 applies the timing advance and starts a contention resolution procedure.

In one example, during contention resolution, the scheduled entity 2204 may multiplex a CSI/CQI report in 2218 with an uplink message (msg3) 2212 such as a PUSCH on the common control channel (CCCH) using the TA and assigned uplink resources in the PDSCH of msg2 2210. In an example, the multiplexing may be performed similarly to the PUSCH reTX multiplexing 1600 described above in connection with FIG. 16. Upon successfully decoding the uplink message, the scheduling entity 2202 transmits a contention resolution message 2214 (msg4) to the scheduled entity 2204. The scheduled entity 2204, upon receiving its own identity back in the contention resolution message 2214, concludes that the random-access procedure was successful and completes the RRC connection setup process.

As mentioned above, msg4 2214 may have a PDCCH control component and a PDSCH payload component.

In an alternative/additional example, with the contention resolved from msg4 2214, the scheduled entity 2204 may multiplex a CSI/CQI report in msg5 (e.g., acknowledgement "ACK" for msg4) in block 2220. The multiplexing may be performed similarly to the techniques disclosed above in connection with FIG. 19. The CSI/CQI report is then multiplexed and transmitted with the HARQ ACK in PUCCH message 2216.

Figure 23:
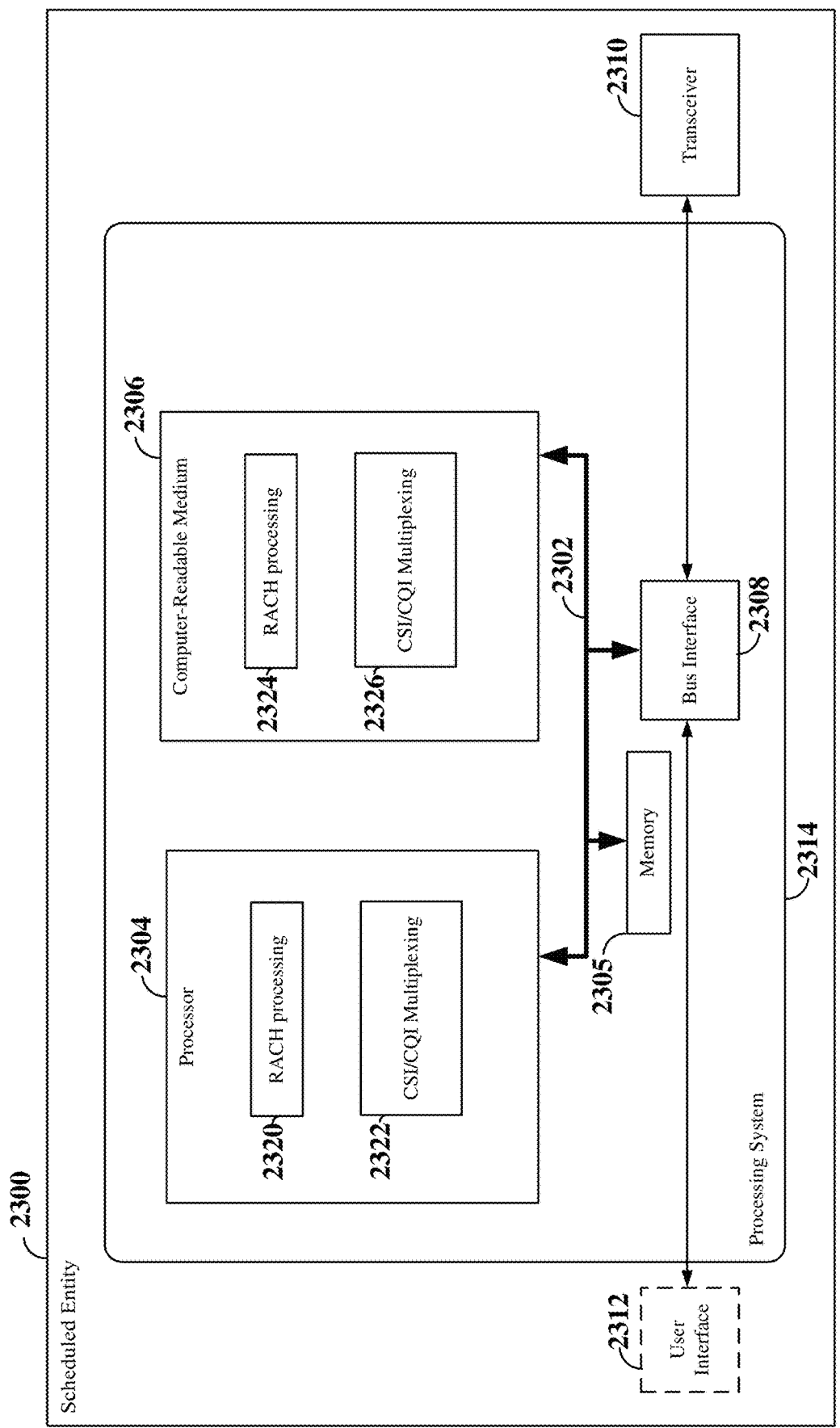
FIG. 23 is a block diagram illustrating an example of a hardware implementation for a scheduled entity employing a processing system according to some aspects.

FIG. 23 is a block diagram illustrating an example of a hardware implementation for a scheduled entity 2300 employing a processing system 2314 according to some aspects. For example, the scheduling entity 2300 may be a user equipment (UE) as illustrated in any one or more of FIGS. 1 and/or 2.

The scheduled entity 2300 may be implemented with a processing system 2314 (or "processing apparatus") that includes one or more processors 2304. Examples of processors 2304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduled entity 2300 may be configured to perform any one or more of the functions described herein, including, but not limited to, NR and NR light communications, including RACH procedures and CSI/CQI multiplexing as described above. That is, the processor 2304, as utilized in the scheduled entity 2300, may be used to implement any one or more of the processes and procedures described herein.

In this example, the processing system 2314 may be implemented with a bus architecture, represented generally by the bus 2302. The bus 2302 may include any number of interconnecting buses and bridges depending on the specific application of the processing system 2314 and the overall design constraints. The bus 2302 communicatively couples together various circuits including one or more processors (represented generally by the processor 2304), a memory 2305, and computer-readable media (represented generally by the computer-readable medium 2306). The bus 2302 may also link various other circuits such as timing sources, peripherals, voltage regulators, and power management circuits, which are well known in the art, and therefore, will not be described any further. A bus interface 2308 provides an interface between the bus 2302 and a transceiver 2310. The transceiver 2310 provides a communication interface or means for communicating with various other apparatus over a transmission medium. Depending upon the nature of the apparatus, a user interface 2312 (e.g., keypad, display, speaker, microphone, joystick) may also be provided. Of course, such a user interface 2312 is optional, and may be omitted in some examples.

In some aspects of the disclosure, the processor 2304 may include RACH processing circuitry 2320 configured to implement, for example, RACH procedures described herein, such as technologies and techniques described in FIGS. 7, 9-11, 16, 19 and 22 above. CSI/CQI multiplexing circuitry 2322 may be configured, for example, to implement CSI/CQI report multiplexing, such as those described herein, and techniques described in FIGS. 11-22 above. The processor 2304 is responsible for managing the bus 2302 and general processing, including the execution of software stored on the computer-readable medium 2306. The software, when executed by the processor 2304, causes the processing system 2314 to perform the various functions described below for any particular apparatus. The computer-readable medium 2306 and the memory 2305 may also be used for storing data that is manipulated by the processor 2304 when executing software.

One or more processors 2304 in the processing system 2314 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 2306. The computer-readable medium 2306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random-access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 2306 may reside in the processing system 2314, external to the processing system 2314, or distributed across multiple entities including the processing system 2314. The computer-readable medium 2306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 2306 may include RACH processing instructions 2306 configured for various functions, including, but not limited to, RACH processing associated with functions of RACH processor 2320. The computer-readable storage medium 2306 may also include CSI/CQI multiplexing instructions 2326 configured for various functions, including, but not limited to, CSI/CQI report multiplexing associated with the functions of CSI/CQI multiplexing circuitry 2322.

Of course, in the above examples, the circuitry included in the processor 2314 is merely provided as an example, and other means for carrying out the described functions may be included within various aspects of the present disclosure, including but not limited to the instructions stored in the computer-readable storage medium 2306, or any other suitable apparatus or means described in any one of the FIGS. 1-2 and 4, and utilizing, for example, the processes and/or algorithms described herein.

Figure 24:
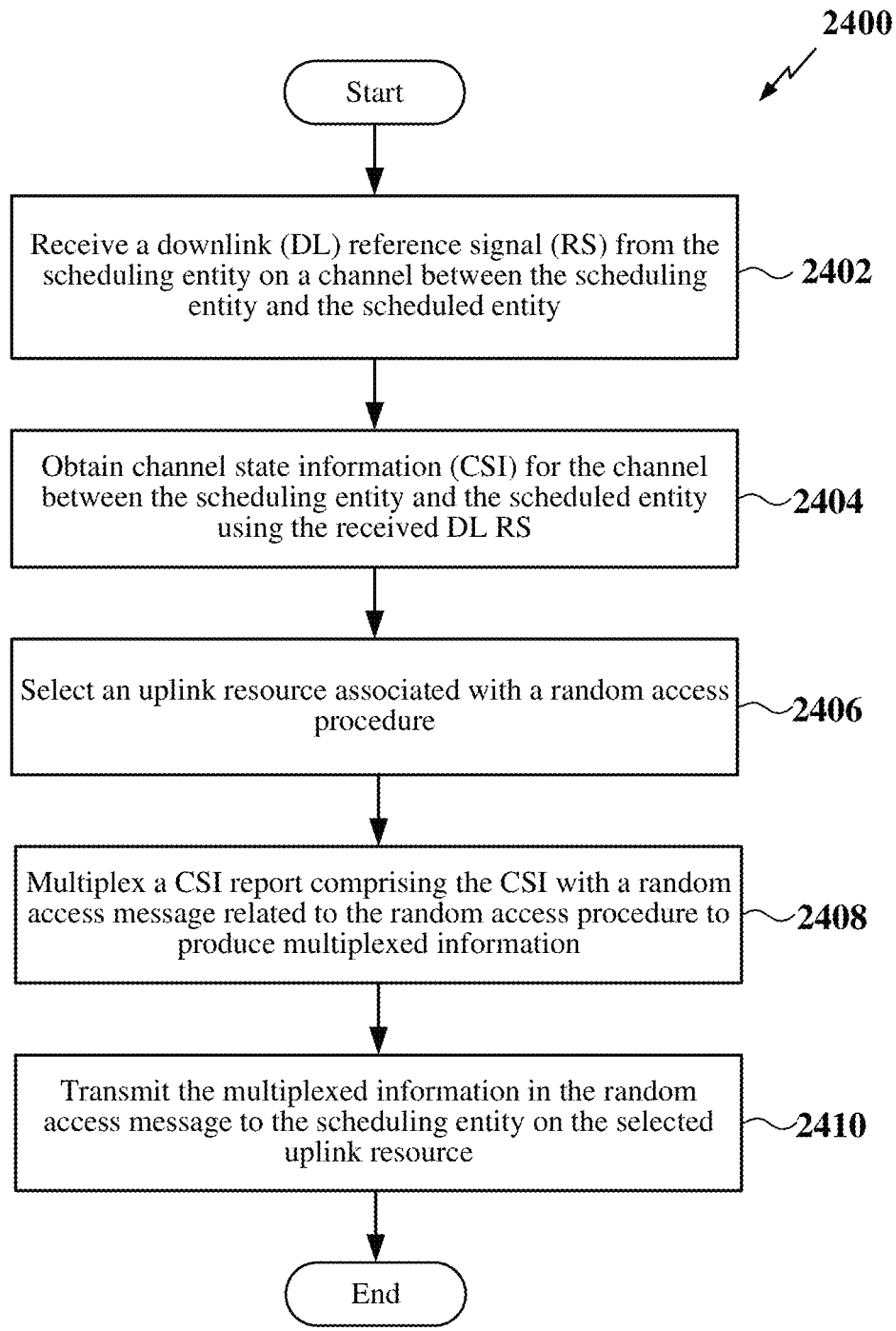
FIG. 24 is a flow chart illustrating an exemplary process for multiplexing a CSI report with a random-access procedure message according to some aspects.

FIG. 24 is a flow chart 2400 illustrating an exemplary process for multiplexing a CSI report with a random-access procedure message according to some aspects. In block 2402, a scheduled entity (e.g., 106) receives a downlink (DL) reference signal (RS) from the scheduling entity (e.g., 108) on a channel between the scheduling entity and the scheduled entity. In block 2404, the scheduled entity obtains channel state information (CSI) for the channel between the scheduling entity and the scheduled entity using the received DL RS, and selects an uplink resource associated with a random-access procedure in block 2406. In block 2408, the scheduled entity multiplexes a CSI report comprising the CSI with a random-access message related to the random-access procedure to produce multiplexed information, and transmits the multiplexed information in the random-access message to the scheduling entity on the selected uplink resource in block 2410.

It should be appreciated by one skilled in the art that the present disclosure provides a multitude of technologies and techniques for multiplexing CSI/CQI reports during RACH procedures, and further provides improved communications in a variety of scheduled entity operating states. As an example, for idle or inactive scheduled entities, SSB-based RSRP measurements can be multiplexed with CCCH message and mapped to msgA PUSCH, allowing refined RSRP measurement to be made on msgB or the RS scheduled by msgB. CSI reporting can be triggered by the fallbackRAR or successRAR carried by msgB. Alternately or in addition, the CSI report can be multiplexed with the HARQ ACK to successRAR, or multiplexed with the PUSCH reTX scheduled by fallbackRAR. In another example, for connected scheduled entities, CSI-RS to RO or SSB-RO association pattern can be signaled in dedicated RRC signaling or wake-up signal (WUS). The scheduled entity can multiplex the CSI report with C-RNTI in msgA PUSCH, based on the measurements of SSB or CSI-RS. Refined CSI reporting can be made on msgB or the CSI-RS scheduled by msgB. The CSI report can be multiplexed with the HARQ ACK to msgB, or multiplexed it with the PUSCH reTX scheduled by fallbackRAR as disclosed above.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-24 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 6-7, 9-11, 16, 19 and 22-23 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The invention claimed is:

1. A method of wireless communication between a scheduled entity and a scheduling entity in a wireless communication network, the method comprising, at the scheduled entity:
receiving a downlink (DL) reference signal (RS) from the scheduling entity on a channel between the scheduling entity and the scheduled entity;
obtaining channel state information (CSI) for the channel between the scheduling entity and the scheduled entity using the received DL RS;
selecting an uplink resource associated with a random-access procedure;
multiplexing a CSI report comprising the CSI with a random-access message related to the random-access procedure to produce multiplexed information;
transmitting the multiplexed information in the random-access message to the scheduling entity on the selected uplink resource;
wherein the random-access message comprises a physical uplink shared channel (PUSCH) for a type-1 random-access procedure or a type-2 random-access procedure and wherein the multiplexed information is carried in the PUSCH; and
wherein the multiplexing the CSI report with the random-access message comprises mapping the CSI report to a medium access control (MAC) control element (CE) of a PUSCH payload and multiplexing the MAC CE with the random-access message.

2. The method of claim 1, wherein the DL RS comprises at least one of a synchronization signal block (SSB) or a CSI-RS, and wherein the DL RS is at least one of broadcasted or dedicated to the scheduled entity.

3. The method of claim 1, wherein the obtaining the CSI comprises measuring the received DL RS.

4. The method of claim 1, wherein the scheduled entity has an idle radio resource control (RRC) status, wherein the random-access message comprises a common control channel (CCCH) message, and wherein the multiplexing the CSI report with the random-access message comprises multiplexing the CSI report with the CCCH message.

5. The method of claim 1, wherein the scheduled entity has a connected RRC status, wherein the random-access message comprises a Cell Radio Network Temporary Identifier (C-RNTI), and wherein the multiplexing the CSI report with the random-access message comprises multiplexing the CSI report with the C-RNTI.

6. The method of claim 1, wherein the selected uplink resource is utilized for transmission of a preamble and the PUSCH for a type-2 random-access procedure.

7. The method of claim 1, wherein the multiplexing the CSI report with the random-access message comprises mapping the CSI report to uplink control information (UCI) and multiplexing the UCI with the random-access message.

8. The method of claim 7, wherein the multiplexing the UCI with the random-access message comprises puncturing resource elements (REs) of a PUSCH payload.

9. The method of claim 7, wherein the multiplexing the UCI with the random-access message comprises rate matching resource elements (REs) of a PUSCH payload.

10. The method of claim 1, wherein the random-access message comprises one or more of a common control channel message, a cell radio network temporary identifier, user plane data or control plane data.

11. The method of claim 1, further comprising receiving a random-access channel (RACH) configuration message via at least one of radio resource control (RRC) signaling or a system information block (SIB), and wherein the selecting an uplink resource is performed based on the RACH configuration message.

12. The method of claim 1, wherein the uplink resource is utilized for transmission of a physical uplink control channel (PUCCH) for CSI reporting and hybrid automatic repeat request (HARQ) feedback and wherein multiplexing the CSI report with the random-access message comprises multiplexing the CSI report with the HARQ feedback.

13. The method of claim 1, wherein the uplink resource is utilized for transmission of a physical uplink shared channel (PUSCH) for HARQ feedback after decoding of a random-access response (RAR), the method further comprising mapping the HARQ feedback to uplink control information (UCI), multiplexing the UCI with the PUSCH, and wherein the multiplexing the CSI report with the random-access message is done either by puncturing resource elements (RE) of the PUSCH or by rate matching.

14. The method of claim 13. further comprising receiving a downlink control channel message scheduling the RAR, wherein the downlink control channel message comprises a trigger to transmit the CSI report in the PUSCH or in a physical uplink control channel (PUCCH).

15. The method of claim 1, further comprising comparing a payload size of the random-access message to a network configured data size threshold for the uplink resource and transmitting the multiplexed information in response to the comparison.

16. A method of wireless communication between a scheduled entity and a scheduling entity in a wireless communication network, the method comprising, at the scheduled entity:
receiving a downlink (DL) reference signal (RS) from the scheduling entity on a channel between the scheduling entity and the scheduled entity;
obtaining channel state information (CSI) for the channel between the scheduling entity and the scheduled entity using the received DL RS;
selecting an uplink resource associated with a random-access procedure;
multiplexing a CSI report comprising the CSI with a random-access message related to the random-access procedure to produce multiplexed information;
transmitting the multiplexed information in the random-access message to the scheduling entity on the selected uplink resource;
receiving a random-access response (RAR) from the scheduling entity after initiating the random-access procedure, the RAR scheduling the PUSCH, wherein transmitting the multiplexed information comprises transmitting the PUSCH in response to the RAR;
wherein the random-access message comprises a physical uplink shared channel (PUSCH) for a type-1 random-access procedure or a type-2 random-access procedure and wherein the multiplexed information is carried in the PUSCH; and
wherein the multiplexing the CSI report with the random-access message comprises mapping the CSI report to a medium access control (MAC) control element (CE) of the PUSCH and multiplexing the MAC CE with the PUSCH.

17. The scheduled entity of claim 16, wherein the DL RS comprises at least one of a synchronization signal block (SSB) or a CSI-RS, and wherein the DL RS is at least one of broadcasted or dedicated to the scheduled entity.

18. The method of claim 16, wherein the RAR comprises a trigger to transmit the CSI report in the PUSCH.

19. The method of claim 16, further comprising receiving a downlink control channel message from the scheduling entity before transmitting the PUSCH, wherein the control channel message comprises a trigger to transmit the CSI report in the PUSCH.

20. The method of claim 19, wherein the downlink control channel message comprises a msg2 physical downlink control channel (PDCCH) of a type-1 random-access procedure or a msgB PDCCH of a type-2 random-access procedure.

21. A scheduled entity within a wireless communication network, comprising:
a transceiver;
a memory; and
a processor communicatively coupled to the transceiver and the memory, wherein the processor and the memory are configured to:
receive a downlink (DL) reference signal (RS) from the scheduling entity on a channel between the scheduling entity and the scheduled entity;
obtain channel state information (CSI) for the channel between the scheduling entity and the scheduled entity using the received DL RS;
select an uplink resource associated with a random-access procedure;
multiplex a CSI report comprising the CSI with a random-access message related to the random-access procedure to produce multiplexed information;
transmit the multiplexed information in the random-access message to the scheduling entity on the selected uplink resource;
receive a random-access response (RAR) from the scheduling entity after initiating the random-access procedure, the RAR schedule the PUSCH, wherein transmit the multiplexed information comprises transmit the PUSCH in response to the RAR;
wherein the random-access message comprises a physical uplink shared channel PUSCH) for a type-1 random-access procedure or a type-2 random-access procedure and wherein the multiplexed information is carried in the PUSCH; and
wherein transmit the PUSCH in response to the RAR comprises decode an uplink (UL) grant in the RAR, wherein the PUSCH comprises a retransmitted PUSCH retransmitted based on the UL grant.

22. The scheduled entity of claim 21, wherein the DL RS comprises at least one of a synchronization signal block (SSB) or a CSI-RS, and wherein the DL RS is at least one of broadcasted or dedicated to the scheduled entity.

23. A method of wireless communication between a scheduled entity and a scheduling entity in a wireless communication network, the method comprising, at the scheduled entity:
receiving a downlink (DL) reference signal (RS) from the scheduling entity on a channel between the scheduling entity and the scheduled entity;
obtaining channel state information (CSI) for the channel between the scheduling entity and the scheduled entity using the received DL RS;
selecting an uplink resource associated with a random-access procedure;
multiplexing a CSI report comprising the CSI with a random-access message related to the random-access procedure to produce multiplexed information;
transmitting the multiplexed information in the random-access message to the scheduling entity on the selected uplink resource;
measuring a received power of a beam-formed reference signal from the scheduling entity;
comparing the measured received power to a threshold; and
transmitting the multiplexed information in response to the comparison.

* * * * *